United States Patent
Saha

(10) Patent No.: US 11,082,338 B1
(45) Date of Patent: Aug. 3, 2021

(54) DISTRIBUTED CONNECTION STATE TRACKING FOR LARGE-VOLUME NETWORK FLOWS

(71) Applicant: Amazon Technologies, Inc., Seattle, WA (US)

(72) Inventor: Avik Kumar Saha, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/955,548

(22) Filed: Apr. 17, 2018

(51) Int. Cl.
  *H04L 12/721* (2013.01)
  *H04L 12/26* (2006.01)

(52) U.S. Cl.
  CPC ............ *H04L 45/70* (2013.01); *H04L 43/062* (2013.01); *H04L 43/0811* (2013.01)

(58) Field of Classification Search
  None
  See application file for complete search history.

(56) References Cited

U.S. PATENT DOCUMENTS

| | | |
|---|---|---|
| 6,601,084 B1 | 7/2003 | Bhaskaran et al. |
| 6,831,917 B1 | 12/2004 | Cheriton |
| 6,993,021 B1 | 1/2006 | Chuah et al. |
| 7,782,782 B1 | 8/2010 | Ferguson et al. |
| 7,865,586 B2 | 1/2011 | Cohn |
| 8,199,651 B1 | 6/2012 | Schrempp et al. |
| 8,244,909 B1 | 8/2012 | Hanson et al. |
| 8,331,371 B2 | 12/2012 | Judge et al. |
| 8,358,658 B2 | 1/2013 | Flynn et al. |
| 8,478,896 B2 | 7/2013 | Ehlers |
| 8,693,470 B1 | 4/2014 | Maxwell et al. |
| 8,873,556 B1 | 10/2014 | Zuk et al. |
| 9,432,245 B1* | 8/2016 | Sorenson, III ........ H04L 47/125 |
| 9,934,273 B1 | 4/2018 | MacCarthaigh |
| 2007/0115990 A1 | 3/2007 | Asati et al. |
| 2008/0005441 A1 | 1/2008 | Droux et al. |
| 2008/0025218 A1 | 1/2008 | Liu |
| 2008/0181102 A1* | 7/2008 | Del Regno ............ H04L 45/50 370/223 |
| 2008/0228932 A1 | 9/2008 | Monette et al. |
| 2010/0074256 A1 | 3/2010 | Seok et al. |
| 2010/0281181 A1 | 11/2010 | Johnson et al. |

(Continued)

FOREIGN PATENT DOCUMENTS

WO    2008110955    9/2008

OTHER PUBLICATIONS

"A Brief Primer on Anycast", Matthew Prince, Oct. 21, 2011, pp. 1-4.
"Amazon Elastic Compute Cloud", User Guide for Linux, API Version, Jun. 15, 2014, pp. 1-684.
Amazon Web Services, "Shuffle Sharding: massive and magical fault isolation", http://www.awsarchitectureblog.com/2014/04/shuffle-sharding.html, Sep. 17, 2014, pp. 1-6.

(Continued)

*Primary Examiner* — Steve R Young
(74) *Attorney, Agent, or Firm* — Robert C. Kowert; Kowert, Hood, Munyon, Rankin & Goetzel, P.C.

(57) ABSTRACT

A respective plurality of state tracking nodes is selected at a flow management service for each direction of a bi-directional network flow's traffic prior to routing a first packet of the flow, and state tracking entries for the flow are stored at the nodes. The state tracking entries include a transformation descriptor for the packets of the flow. When a packet of the flow is received, at least one transformed packet corresponding to the received packet is generated and transmitted to a destination indicated by the transformation descriptor.

20 Claims, 16 Drawing Sheets

(56) References Cited

U.S. PATENT DOCUMENTS

| | | |
|---|---|---|
| 2011/0122880 A1 | 5/2011 | Saito et al. |
| 2011/0149964 A1 | 6/2011 | Judge et al. |
| 2014/0078927 A1* | 3/2014 | Thubert ............... H04L 45/50 370/254 |
| 2015/0039674 A1 | 2/2015 | Agarwal et al. |
| 2015/0063360 A1 | 3/2015 | Thakkar et al. |
| 2015/0063364 A1 | 3/2015 | Thakkar et al. |
| 2015/0103672 A1* | 4/2015 | Stuart ................... H04L 45/38 370/241 |
| 2015/0195178 A1 | 7/2015 | Bhattacharya et al. |
| 2015/0263899 A1 | 9/2015 | Tubaltsev et al. |
| 2015/0263946 A1 | 9/2015 | Tubaltsev et al. |
| 2015/0281081 A1 | 10/2015 | Rajahalme |
| 2015/0281125 A1 | 10/2015 | Koponen et al. |
| 2015/0382184 A1 | 12/2015 | Takazoe |
| 2016/0105471 A1* | 4/2016 | Nunes ............... H04L 12/4633 709/228 |
| 2016/0134516 A1* | 5/2016 | Hui ..................... H04L 45/22 370/235 |
| 2016/0173600 A1 | 6/2016 | Galles et al. |
| 2016/0323406 A1* | 11/2016 | Tsuji .................. H04L 67/2814 |
| 2016/0344798 A1 | 11/2016 | Kapila |
| 2017/0126549 A1* | 5/2017 | Paramasivam ....... H04L 47/624 |

OTHER PUBLICATIONS

Costin Raiciu, et al "Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 14/565,164, filed Dec. 9, 2014, Tobias Lars-Olov Holgers, et al.

U.S. Appl. No. 14/526,410, filed Oct. 28, 2014, Eric Jason Brandwine.

U.S. Appl. No. 14/736,165, filed Jun. 10, 2015, Colm MacCarthaigh.

U.S. Appl. No. 14/736,167, filed Jun. 10, 2015, Colm MacCarthaigh.

U.S. Appl. No. 14/736,172, filed Jun. 10, 2015, Colm MacCarthaigh.

U.S. Appl. No. 14/736,163, filed Jun. 10, 2015, Colm MacCarthaigh.

* cited by examiner

DISTRIBUTED CONNECTION STATE TRACKING FOR LARGE-VOLUME NETWORK FLOWS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

As demand for virtualization-based services at provider networks has grown, more and more networking and inter-connectivity-related features have been added to the services. Many such features may require network packet address manipulation in one form or another, e.g., at level 3 or level 4 of the open systems interconnect stack. For example, some providers configure groups of resources as isolated virtual networks on behalf of respective customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of address translation techniques. For some types of applications which may be deployed at such isolated virtual networks or at other platforms, successive requests from a given client of a given application should ideally be directed using packet header manipulation to the same back-end server, further complicating the packet processing requirements. For other applications, it may be useful to obfuscate at least some of the source address information contained in a set of packets in a consistent manner, or to replicate contents of the packets among many different recipients according to specified rules or directives. Managing connection state information pertaining to individual source and destination pairs may present a non-trivial scalability and availability problem in large provider networks at which the traffic associated with hundreds of thousands of virtual or physical machines may be processed concurrently.

Figure 1:
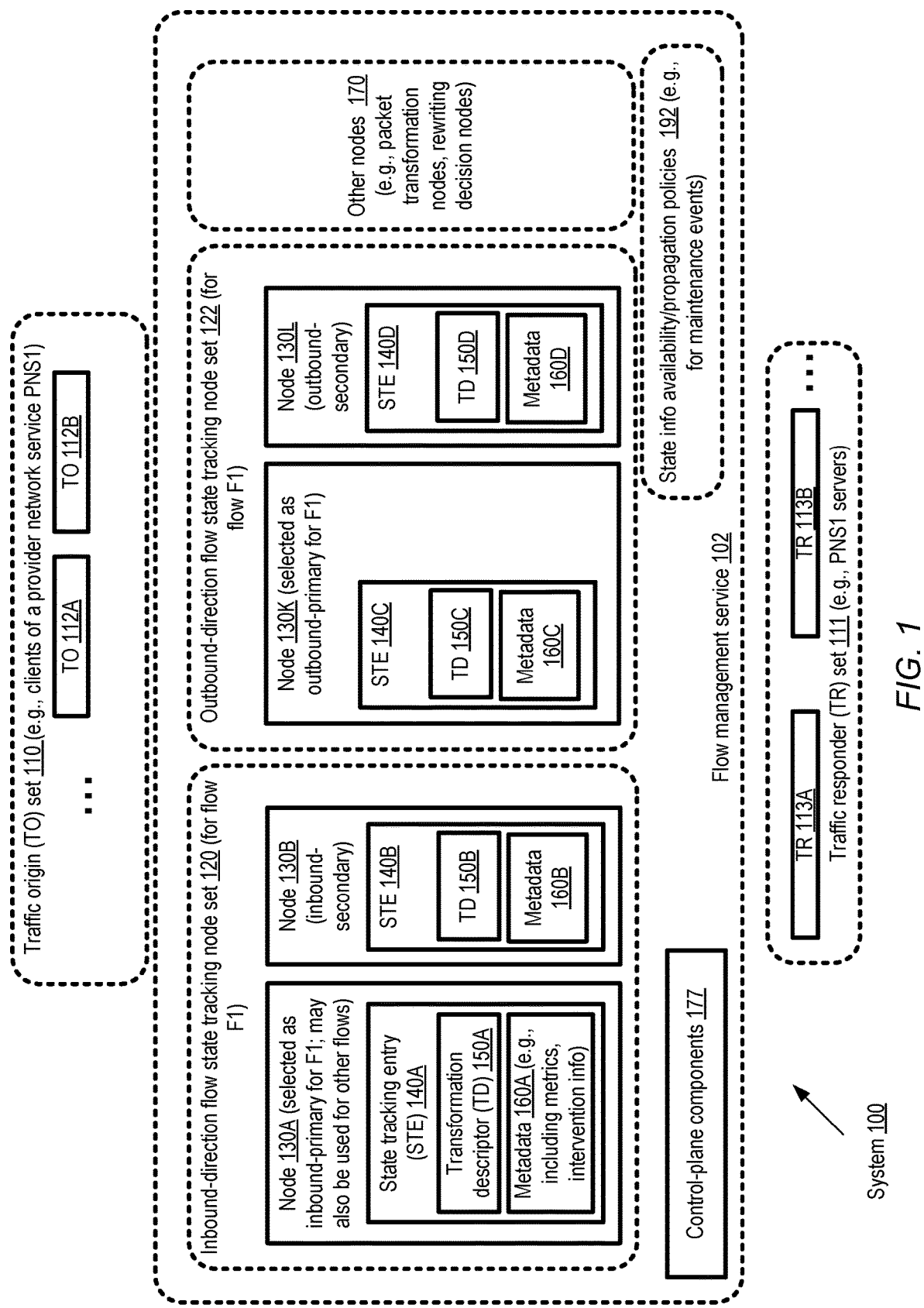
FIG. 1 illustrates an example system environment in which a distributed technique for managing state information for network flows may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing connectivity state information for large volume network flows, e.g., at a provider network or cloud environment in which millions of computing devices may be communicating with other devices concurrently, are described. The techniques may, for example be implemented at a flow management service implemented within the provider network, comprising numerous nodes that each store connection state information in a multi-tenant fashion on behalf of a number of customers of one or more other network-accessible services of a provider network. According to one embodiment, for at least some pairs of communicating devices and/or applications, header and/or data transformations may be implemented for network packets being transmitted in one or both directions—e.g., source address information may be substituted, packets may be duplicated and distributed among several recipients, packets from a given source may be load balanced among several recipient servers, and so on. At a high level, the flow management service may receive indications of such packet transformation or flow management requirements from clients of the services whose traffic is to be managed, and implement the requested types of transformations using one or more nodes allocated for each traffic direction in various embodiments. State information, such as metadata indicating how many packets have been transmitted in one or both directions between a given source and destination endpoint, the protocol-defined state (e.g., TCP (Transfer Control Protocol) state), and information about how certain types of unusual conditions (such as long periods without packet transmission) are to be handled, may be stored at a plurality of nodes in some embodiments, such that a failure at any one node does not impact the management of the traffic for the source and destination. A number of techniques may be used to ensure that maintenance events, such as rollouts of new versions of software or firmware at the flow management service nodes, do not impact client traffic flows in various embodiments.

As one skilled in the art will appreciate in light of this disclosure, certain embodiments may be capable of achieving various advantages, including some or all of the following: (a) improving the overall availability and reliability of network connections to, from, and among the computing devices of various network-accessible services implemented at a provider network, such as a virtualized computing service, various database and/or storage services and the like, (b) enabling clients of network-accessible services to customize the manner in which various types of unusual events are to be handled with respect to network traffic flowing on behalf of the client, and/or (c) reducing the probability that a traffic disruption or failure results at various network-accessible services from a maintenance event such as a rollout of a software or firmware update.

According to various embodiments, a representation of a flow management requirement of a client of a network-accessible service may be obtained at one or more computing devices of a flow management service. The requirement may, for example, include (a) a set of source addresses of network packets, (b) a set of destination addresses, (c) a packet transformation descriptor indicating the manner in which one or more packets are to be transformed at the flow management service before being transmitted towards their intended destinations, and/or (d) a flow intervention descriptor indicating an action to be implemented in response to a detection that a network flow satisfies a specified condition. One example of a condition indicated in an intervention descriptor in one embodiment and a corresponding action, may include the logical equivalent of the following: if the number of packets that have been transmitted in a particular direction of a connection which is in the "ESTABLISHED" TCP state in the last N seconds is below a threshold T, send a control packet to at least one endpoint of the connection. The receipt and processing of the requirement may be considered part of a traffic setup or configuration stage for network flows associated with one or more applications and clients in some embodiments, where a particular flow may be distinguished from other flows based on a tuple comprising some combination of the elements (network protocol, source network address, source network port, destination network address, destination network port, client identifier). In various embodiments, despite the use of the terms "source" and "destination", network packets may flow in either direction among the endpoints of a flow—e.g., the roles of the source and destination may be reversed depending on the direction in which a packet is being transmitted. Such flows may also be termed bi-directional flows. Respective data structures referred to as state tracking entries may be generated and stored for individual ones of the flows in some embodiments at the flow management service.

When any given data packet is received at some nodes of the flow management service, in various embodiments an attempt may be made to determine whether a flow state tracking entry for the flow to which the data packet belongs has already been created. In at least one embodiment, when the very first packet of a flow is received, no such state tracking entry may be found. In response to detecting that a state tracking entry for a particular bi-directional network flow has not yet been stored at the flow management service, a number of state tracking nodes for the particular-bidirectional flow may be identified or selected in various embodiments, e.g., prior to the routing of any of the packets towards their destinations from the flow management service. In one embodiment, at least a pair of nodes may be identified for each direction of the traffic—e.g., a minimum of two flow state tracking nodes may be selected for packets transmitted from the source to the destination, and a minimum of two flow state tracking nodes may be selected for packets transmitted in the reverse direction. A primary and a secondary flow state tracking node may be selected in some embodiments for either direction, with the secondary configured to take over the responsibilities of the primary if required. In some embodiments, when a client submits a requirement for their network flows to the flow management service, an indication of the number of flow state tracking nodes that should be set up for each flow may be included, and the number of nodes selected for one or both directions of traffic may be based on the client's preferences. Also prior to routing any of the data packets of the flow, in some embodiments a respective state tracking entry may be stored at individual ones of the selected state tracking nodes. The state tracking entry may comprise a number of elements in various embodiments, including elements of the client's flow requirement information such as the packet transformation descriptor and the action to be taken if the traffic reaches the specified condition. In at least some embodiments, as indicated above, the state tracking nodes may be identified in response to detecting that the first data packet of a new flow has been received at the flow management service.

In at least one embodiment, a pool of nodes may be pre-configured at the flow management service, e.g., with respective nodes implemented using virtual machines at respective hosts. In some embodiments, guest virtual machines set up using a virtualized computing service of the provider network may be used for the flow state tracking nodes.

In at least one embodiment, virtual machines may not be used for the flow state tracking nodes; instead, for example, un-virtualized computing devices may be used. Subsets of the pool may be selected for a given flow in various embodiments, such that the set of flows whose state is managed using a given node may at least in some cases differ from the set of flows whose state is being managed using another node. Individual nodes may be assigned unique identifiers in various embodiments. A deterministic function may be used to map a given flow identification tuple (e.g., a tuple comprising some combination of (network protocol, source network address, source network port, destination network address, destination network port, client identifier)) to one or more nodes that are to be used for tracking the flow's state information in some embodiments. In some embodiments, a chained or sequential approach to selecting the set of state tracking nodes for a given flow may be used—e.g., a primary flow state tracking node may first be identified for one direction of the traffic, then that primary node may select the secondary node for that direction, the secondary node may select the primary node for the reverse direction, and the primary node for the reverse direction may select the secondary node for the reverse direction.

After the flow state tracking nodes have been identified and the state tracking entries have been initialized, data packets may be transmitted between the sources and destinations of the flow in various embodiments. In response to determining that (a) a particular packet of flow has been received at the flow management service and (b) the specified condition requiring an intervention is not satisfied by the flow, at least one transformed packet corresponding to the particular packet may be transmitted from the flow management service to a destination selected based at least in part on the packet transformation descriptor. As more packets are transmitted, elements of one or more of the state tracking entries may be updated over time in various embodiments, and may be used to make various kinds of traffic management decisions. If and when the specified condition is satisfied by the flow, the corresponding action indicated by the client may be initiated in various embodiments.

A number of types of conditions may be handled using client-specified intervention descriptors in various embodiments. For example, in one embodiment, determining that the condition is satisfied may include comparing, to a threshold, an interval that has elapsed since a packet of the flow was transmitted in at least one direction while the connection was in one or more specified protocol-defined states (such as the "ESTABLISHED" state of TCP). The corresponding action to be taken, if the interval equals or exceeds the threshold may, for example, include sending a special control packet to one or more endpoints participating in the flow. Such control packets may, for example, represent requests to keep the connection alive instead of, for example, dropping subsequent packets or initiating a termination of the connection as may occur in the absence of the special control packets. Other types of conditions for which client-application-dependent interventions may be requested may include, for example, the transmission of over a particular number of packets per a specified time interval, the detection of unusual temporal patterns in received packets, the detection of unexpected packet sizes with respect to an application which typically involves transfers of packets of a specified size, and so on.

According to one embodiment, special actions may be taken to handle maintenance events at the flow management service. A particular flow state tracking node may receive an indication that a maintenance operation is to be initiated at the node, such that during at least a portion of the maintenance operation, the particular node cannot receive or process updates to be applied to its state tracking entries, store new entries and so on. The particular node may replicate, prior to the initiation of the maintenance operation, one or more of its state tracking entries at one or more destinations—e.g., at other state tracking nodes that have been designated for the flows being managed by the particular node, and/or at a storage device that is accessible from the other flow state tracking nodes.

Generally speaking, a flow management service (FMS) may receive network packets from a plurality of traffic sources, classify a given received packet as a member of a particular network flow, identify a transformation descriptor or directive (e.g., one or more rules) for transformation(s) that are to be applied to packets of that flow, generate one or more output packets based on the rule(s), and transmit the output packets to one or more destinations (where the destinations may in some case have been selected based on the rule). The same directive may be applied consistently for multiple packets belonging to the same flow in at least some embodiments, and the transformations may involve changes to one or more headers. The FMS may be set up to fulfill stateful packet processing requirements of a number of different categories in a provider network environment in some embodiments as described below in further detail—e.g., requirements for stateful anycast, multicast, source address substitution, load balancing, and the like may all be handled by the same set of nodes of the FMS. The terms "packet processing", "packet transformation", and "packet rewriting" may be used synonymously in some embodiments. In at least some embodiments, the packet transformations may be implemented at layers 3 (the network layer) and/or 4 (the transport layer) of the open systems interconnect (OSI) model for networking.

In various embodiments, the FMS may be implemented as a distributed system comprising several different logical and/or physical tiers of nodes. One tier, called the packet transformation tier, may be responsible largely for applying packet transformation/rewriting directives (which may each comprise one or more rules or parameters) on received packets, and sending the results of the rewriting to the appropriate destinations. The nodes of the packet transformation tier may be referred to as packet transformers in various embodiments Another tier, called the flow state tracking tier, may be largely responsible for maintaining the state tracking entries comprising metadata regarding various flows, e.g., information about the rates at which packets are being processed (which may be useful for billing purposes in some cases), how long ago the most recent packet of a given flow was processed, and so on. A third tier, called the rewriting decisions tier, may be largely responsible for generating the specific directives which are to be applied at the packet transformation tier to fulfill various client packet processing requirements in some embodiments. The directives may be generated based on various factors—e.g., information maintained at the rewriting decisions tier regarding the workload or availability of different destination devices, flow state metadata obtained from the flow state tracking tier, indications or records of client requirements, and so on. The directives may be provided to the packet transformation nodes for implementation in various embodiments, e.g., via the flow state tracking tier or directly from the rewriting decisions tier. The packet transformations tier may periodically provide updates to the flow state tracking tier (and/or directly to the rewriting decisions tier) regarding the status of various flows. In one simple analogy in which the FMS is compared to a simplified computing device, the rewriting decisions tier may be considered the "CPU" of the FMS, the flow state tracking tier may be considered the "memory", and the packet transformation tier may be considered an "input/output (I/O) device".

Each of the tiers may comprise numerous nodes in some embodiments, with each node configured to interact with one or more nodes at other tiers and/or at its own tier. In some embodiments, some or all the nodes at one or more of the tiers may be implemented at respective virtual machines (e.g., guest virtual machines or GVMs of a virtualized computing service as described below), while in other embodiments, at least some nodes at some tiers may comprise un-virtualized hosts. In one embodiment multiple nodes of one or more tiers may be implemented on the same host. In various embodiments, for a given flow or for a given packet processing requirement, at least two nodes may be assigned at a given FMS tier—e.g., a primary node, and a secondary node configured to take over the responsibilities of the primary node under certain conditions. The rewriting directives, and/or the information required to identify the particular rewriting directive to be applied to a given flow, may be replicated in at least some embodiments, such that the FMS is able to withstand at least some types of failures at any of the tiers.

In some embodiments, as mentioned above, the FMS may be set up at a provider network, e.g., to handle packet processing requirements associated with a virtualized computing service and/or other services. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in various embodiments. At least some provider networks may also be referred to as "public cloud" environments. A given provider network may include numerous data centers hosting various resource pools, such as collections of physical and/or virtualized compute servers, storage devices, networking equipment and the like, needed to implement, configure and distribute the infrastructure and services offered by the provider. In at least some embodiments, a virtualized computing service implemented at a provider network may enable clients to utilize one or more guest virtual machines (which may be also be referred to as "virtualized compute servers", "compute instances" or simply as "instances") for their applications, with one or more compute instances being executed on any given instance host of a large fleet of instance hosts. Several different kinds of instances may be supported in some implementations, e.g., "large", "medium" or "small" instances that have different compute performance capabilities, different memory sizes and different amounts of persistent storage space. In some implementations, some or all of the nodes of a flow management service may be implemented at respective compute instances. Within large provider networks, some data centers may be located in different cities, states or countries than others, and in some embodiments the resources allocated to a given application may be distributed among several such locations to achieve desired levels of availability, fault-resilience and performance. At a provider network whose resources are distributed among numerous data centers or numerous availability containers, respective sets of nodes of each FMS tier may be set up at each data center or in each availability container. Generally speaking, any of a variety of networking protocols, including Transmission Control Protocol/Internet Protocol (TCP/IP) or User Datagram Protocol (UDP), may be used to access and use the resources (including the flow management service) of a provider network, and for communications between different resources of the provider network.

In some embodiments, the virtualized computing service may assign virtual network interfaces (VNIs) to compute instances which may be configured as nodes of the FMS, and/or to compute instances acting as clients of the FMS. A VNI may comprise a logical entity with a set of networking and security-related attributes that can be attached to (or detached from) a compute instance programmatically. For example, at least one IP (Internet Protocol) address "IPaddr1" may be assigned to a given virtual network interface VNI1, and security rules restricting inbound and outbound traffic may be set for VNI1. When that VNI is programmatically attached to a given compute instance CI1 launched at an instance host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to CI2 (which is executing at a different instance host with a different physical network interface card NIC2), the IPaddr1 traffic that was previously being received at CI1 may now be received at CI2, with the same security rules in place. Support for virtual network interfaces may considerably simplify network configuration tasks for customers using the virtualized computing service, including the operation of various nodes of the FMS in some embodiments as described below in further detail.

According to one embodiment, packet transformation rules/directives and/or state tracking entries (which may contain packet transformation rules) may be cached at one or more layers of a multi-layer FMS. For example, at least some of the nodes of the packet transformation tier of the FMS may maintain respective caches of rewriting directives or rewrite entries indicating the actions to be taken on received packets belonging to various flows. As mentioned earlier, in at least some embodiments a deterministic function whose input includes the flow identification elements may be used to select the nodes at any given layer or tier of a multi-layer FMS. When a packet is received at a particular packet transformation node, one or more elements of the packet header may be extracted to identify the flow to which the packet belongs, and the node's cache may be examined to check whether a rewrite entry indicating the transformation to be performed is present for that flow. If such an entry is present, the transformations indicated in it may be applied, and the resulting transformed or generated packets may be transmitted to their destination or destinations. The transformed packets may also be referred to as "outbound" packets with respect to the FMS, while the received packets which trigger the transformations may be referred to as "inbound" packets. The packet transformation node may also update various metadata entries regarding the flow (such as a timestamp of the most recent operation performed for the flow, an update to one or more sequence numbers associated with the flow, etc.) in some embodiments.

Periodically or on demand, metadata associated with the flow may be sent to one or more nodes of the flow state tracking tier responsible for the flow (also selected using a similar deterministic function). The general technique of assigning one or more nodes from a pool of nodes for the purposes of handling operations performed on behalf of a given client of the FMS may be termed "client-based partitioning" or "client-based sharding" herein. The technique of selecting a particular destination from a set of possible destinations using a hash function applied to one or more flow identifier elements may be referred to herein as "flow hashing". Thus, in some embodiments client-based partitioning followed by flow hashing may be used to select nodes for a given flow at a given tier. In various embodiments the nodes of the various tiers of the FMS may be multi-tenant—that is, a given node at a given tier may in some cases be responsible for operations associated with multiple flows related to multiple packet processing requirements of multiple clients.

If the packet transformation node fails to find an entry in its cache, in at least some embodiments it may transmit an indication of the cache miss (which may, for example, comprise at least some of the contents of the received packet, or the entire received packet) to one of the other layers of the FMS. In one embodiment the cache miss indication may be sent to a particular node of the flow state tracking layer, e.g., one of the plurality of state tracking nodes that selected for the flow using a deterministic function. In other embodiments, the cache miss indication may be sent to a particular node of the rewriting decisions tier instead of, or in addition to, being sent to the flow state tracking tier.

A flow state tracking node which receives a cache miss indicator may maintain its own cache of rewrite entries and/or state tracking entries in some embodiments, which may be referred to as the flow state entry cache. If an entry containing a rewriting directive to be used with respect to the packet associated with the cache miss is found in the flow state entry cache, the entry (or at least a portion of the entry which indicates the transformations to be applied) may be sent to the packet transformer node at which the cache miss occurred in such embodiments. If the flow state entry cache lookup also results in a miss, a request for a rewriting entry or directive may be sent to a node of the rewriting decisions tier (also selected using a deterministic function of the kind discussed above) in at least some embodiments. To avoid the possibility of conflicting packet rewriting decisions being made for different packets of a given flow, in various embodiments a single rewriting decisions node may be designated as the primary node responsible for the decisions made regarding a given packet processing requirement (such as a requirement to obscure or substitute source address entries from packets originating at some set of client addresses, or a requirement to implement multicast or anycast). That is, at the rewriting decisions tier, a given node may be responsible for all the flows associated with a client requirement or application in some embodiments, whereas at other tiers different nodes may be selected for different packets of a given flow in such embodiments.

In some embodiments the rewriting decisions node may maintain its own decisions cache, and check whether a rewriting decision has already been made for the cache miss whose indication is received from the flow state tracking tier (or from the packet transformation tier). If the decisions cache contains an appropriate entry, it may be retrieved and sent to the node from which the cache miss indication was received in various embodiments. Otherwise, (e.g., if the cache miss was caused by the first packet of a flow) the rewriting decisions node may generate one or rewriting directives corresponding to the flow whose packet led to the cache miss at the other tiers. In at least some embodiments, the rewrite directive may be replicated at one or more other nodes of the rewriting decisions tier before the directive is transmitted back to one or both of the other tiers. In one embodiment, if the cache miss indicator is received at a node RDN1 of the rewriting decisions tier, RDN1 may be considered the primary rewriting decisions node for the corresponding packet processing requirement, and the generated rewriting directive may be replicated to a secondary node RDN2 of the rewriting decisions tier. In some implementations, the secondary node RDN2 may be responsible for sending the rewrite directive back to the flow state tracking node from which the cache miss indicator was received at RDN1. In some embodiments, depending on the desired availability or durability level of the FMS, multiple replicas of the rewriting decision or directive may be stored at respective nodes of the rewriting decisions tier.

The rewriting decision itself (e.g., exactly which headers of the received packets are to be transformed, how many output packets are to be generated per received packet, etc.) may be made based on various factors, depending for example on the particular category of packet processing requirement to be fulfilled. In some embodiments, for example, a specific client requirement for packet processing may be associated with a particular virtual network interface address which is indicated in the received packet, and the rewriting decisions nodes may be able to determine the client requirement by examining one or more elements or headers of the received packet (which may be included in the cache miss indication). The rewriting decisions nodes may have access to a variety of data sources, e.g., of records indicating API calls made by clients for various packet processing requests, and such records may be examined in some cases to determine the rules or directives. Furthermore, for certain kinds of decisions, the rewriting decisions node may also examine other metadata in some embodiments— e.g., definitions or membership lists of multicast/unicast groups, workload metadata indicators of various destination alternatives for transformed packets, data structures that can be examined to select unique source address/port pairs for address substitutions, and the like.

After the rewriting directive reaches the packet transformation node at which the original packet of the flow was received, the directive may be stored in the cache so that it can be re-used for subsequent received packets corresponding to the same client requirement in various embodiments. One or more transformed or outbound packets corresponding to the original packet may be generated in accordance with the rewrite directive, and transmitted towards their destinations. Metadata regarding the flow may be updated locally at the packet transformation node, e.g., for eventual inclusion in a metadata refresh message sent to the flow state tracking tier. In some embodiments, when a cache miss occurs at the packet transformation tier, the transformed packets corresponding to cache miss may be generated at, and/or sent to their destinations from, a node involved in responding to the cache miss. For example, a flow state tracking node that responds to a packet transformation tier cache miss may itself transmit the transformed packets based on a generated rewrite directive, and provide the rewrite directive to the packet transformation tier for use with respect to subsequent packets of the flow. In one embodiment, the rewriting decisions node may transmit a transformed packet with respect to the first received packet of a given flow, and transmit the rewrite entry to the other tiers for implementation on subsequent packets of the flow.

In various embodiments, once a rewrite decision has been made for a given flow and the corresponding directive is cached at the packet transformation tier, numerous additional packets of the flow may be processed at the packet transformation tier using that directive without any further interaction with the other tiers (apart from relatively infrequent metadata update messages sent to one or more of the other tiers). In at least some embodiments, therefore, a large fleet (e.g., tens of thousands) of packet transformation nodes may be configured, while fewer nodes may be configured for the other tiers. In large provider network environments whose resources are distributed among a plurality of data centers, some of which may be located in different cities, states, or countries than others, respective subsets of the different FMS tiers may be established in each data center or at each physical location.

Eventually, after some number of packets of a given flow have been processed, a request to terminate the flow (e.g., a connection close request) may be received at a packet transformation node associated with the flow. In some embodiments, the packet transformation node may clear the corresponding entry in its cache of rewrite entries, and indicate (e.g., either immediately or as part of its next batched metadata update) the termination of the flow to the flow state tracking tier. The flow state tracking node may propagate the updated information regarding the state of various in-process or completed flows to the appropriate rewriting decisions nodes in various embodiments. The received metadata may be used at to make subsequent rewriting decisions in at least some embodiments—e.g., the fact that a given flow has terminated may allow an IP address or port associated with that flow to be re-used for a different flow, and so on.

In at least some embodiments, the functionality of the three tiers of the FMS introduced above may be combined into a smaller number of tiers. For example, in one embodiment the FMS may comprise a plurality of nodes arranged as members of a single tier, all of which are configured to store state tracking entries, and to perform some or all of the tasks of packet transformation and making rewriting decisions discussed above.

Example System Environment

FIG. 1 illustrates an example system environment in which a distributed technique for managing state information for network flows may be implemented, according to at least some embodiments. As shown, system 100 comprises various components of a flow management service, used to transform network packets flowing in either direction between a traffic origin set 110 (e.g., clients of a provider network service PNS1) and a traffic responder set 111 (e.g., servers implementing the functionality of PNS1). Traffic origin set 110 may comprise a plurality of traffic origin devices 112, such as TO 112A, 112B and the like, each configured with a respective network address, and traffic responder set 111 may also comprise a plurality of traffic responder devices such as TR 113A, 113B etc. with a respective network address. Depending on the specific application whose traffic is being managed with the help of FMS 102, the actual network address of a TR to which a particular packet originated at a TO will be delivered may not be known at the TO in at least some embodiments, and vice versa. For example, in an embodiment in which a database service or a machine learning service is being implemented at the provider network, a general address for the service as a whole may be used as the destination address by the client TO 112 for a packet that contains a service request, while a specific one of the TRs 113 may be chosen to respond to the request based on packet transformation descriptors available at the FMS.

The FMS 102 may comprise a set of administrative or control-plane components 177 in the depicted embodiment, responsible for tasks such as establishing the fleet of nodes 130 of the FMS, monitoring health state information, receiving and initial processing of client requests indicating their flow management requirements, and so on. Individual nodes of the FMS may be implemented, for example, using guest virtual machines instantiated at a virtualized computing service of a provider network in some embodiments. In other embodiments, non-virtualized computing devices may be used. For example, in some embodiments, a flow management requirement request received from a client may indicate (a) a set of source addresses of network packets (e.g., addresses of a group of TOs 112), (b) a set of destination addresses (e.g., addresses of a group of TRs 113), (c) a packet transformation descriptor (indicating how packets transmitted in either direction between the sources and destinations are to be modified/transformed/rewritten at the FMS), and/or (d) a flow intervention descriptor indicating one or more respective types of actions to be implemented in response to detecting that a network flow between the sources and destinations satisfies one or more conditions. At least a subset of the flow management request contents may be stored as respective rules in a rule repository of the FMS in various embodiments, from which they may be accessed by various data plane (non-administrative) and control plane components of the FMS as needed.

In various embodiments, a given network flow may be distinguished from other flows by some combination of the elements of a tuple comprising the elements (network protocol, source network address, source network port, destination network address, destination network port, client identifier). The client identifier may itself be based on one or more of a client account identifier, an identifier of a particular virtual network interface (VNI) established on behalf of a client, an identifier of a service being accessed using the FMS, and/or an identifier of an isolated virtual network (IVN) set up on behalf of the client in some embodiments. After the flow management request pertaining to a set of network flows has been received and the corresponding entries have been stored in the FMS rule repository, in various embodiments the transmission of data packets associated with the sources/destinations indicated may begin. In at least one embodiment, if a data packet of a flow F1 is received at the FMS, and there is no entry stored in the repository indicating the flow management requirement associated with F1, the data packet may be dropped. In another embodiment, if a data packet of a flow F1 is received and there is no entry stored in the repository indicating the flow management requirement associated with F1, the FMS may attempt to notify the client on whose behalf the data packet was transmitted that the flow management requirement is missing (e.g., by transmitting messages to one or more destinations of administrative entities associated with the client account).

When the first packet of bi-directional flow F1 is received at the FMS from a TO 112, a respective plurality of flow state tracking nodes 130 from the FMS fleet may be identified for each direction of traffic flow in the depicted embodiment, e.g., before the first packet is routed to an intended destination. For example, node set 120 comprising nodes 130A and 130B may be selected for inbound (TO-to-TR) packets, while node set 122 comprising nodes 13)k and 130L may be selected for outbound (TR-to-TO) traffic. In some embodiments, more (or less) than two nodes may be selected for either direction, e.g., based on preferences indicated by the client in the flow management request. In the depicted embodiment, node 130A may be designated as a primary node for inbound traffic, node 130B as the secondary node for inbound traffic, node 130K as the primary node for outbound traffic, and node 130L as the secondary node for outbound traffic. During normal operations, in various embodiments, the primary node for a given direction of traffic may update and/or propagate state information pertaining to that particular direction, while the secondary node remain available to assume the primary's responsibilities if needed (e.g., in the event that the primary becomes unreachable or fails). In some embodiments, the primary node may periodically or on demand propagate state information (e.g., state tracking entries 140) to the secondary for its traffic direction, and/or to the primary and secondary of the node set selected for the reverse traffic direction. In various embodiments, a deterministic mapping function (e.g., a hash function) from elements of the flow identification tuple (network protocol, source network address, source network port, destination network address, destination network port, client identifier) may be used to select the specific nodes of the state tracking node sets for a given flow from the fleet of nodes of the FMS.

Note that a given node 130 may store state tracking entries for a plurality of flows of one or more clients and/or one or more network-accessible services, and may be assigned different roles for the different flows in some embodiments. For example, node 130A may be a primary node for inbound traffic of client C1's flow F1, a secondary node for outbound traffic of client C2's flow management requirement FMR2, a primary node for inbound traffic of C1's flow management requirement FMR3, etc. In at least some embodiments, at least some nodes of a node set 120 and/or 122 may be selected by other nodes of the node set(s): e.g., after a primary node is chosen for a particular direction (e.g., inbound traffic) for a given flow, that primary node may select the secondary node for that direction, the secondary node may choose the primary node for the reverse direction, and the primary node for the reverse direction may choose the secondary node for the reverse direction. In some embodiments, for increased availability, the flow state tracking nodes for a given flow may be selected such that a failure of a single host does not disrupt flow state management for the flow—e.g., nodes 130A and 130B may be selected such that they are not both on the same host, and nodes 130K and 130L may be selected such that they are not both on the same host (or on the hosts used for 130A and 130B).

In at least some embodiments, before the first data packet of flow F 1 is transmitted to its intended destination, respective state tracking entries 140 for F1, such as STEs 140A, 140B, 140C and 140D may be created and stored at the nodes of node sets 120 and 122. The STEs 140 may include a transformation descriptor 150 (e.g., 150A, 150B, 150C and 150D) indicating packet rewriting/transformation details, and/or metadata 160 (e.g., 160A, 160, 160C or 160D) in various embodiments. At the time of initialization of the STEs, they may all be identical for a given flow in the depicted embodiment; later, in some embodiments, as more data packets of the flow are transmitted, some of the metadata stored at STEs in the different nodes may diverge at least temporarily from the metadata stored at other nodes. The metadata may, for example, include performance and other metrics, intervention descriptor contents (indicating the kinds of actions to be taken if/when the flow reaches a particular state), and the like in various embodiments. In at least some embodiments, the FMS may also include other nodes 170 (such as packet transformation nodes, rewriting decision nodes and the like) as discussed below in further detail. In some embodiments, the FMS nodes may be responsible for implementing a set of state information availability or propagation policies 192—e.g., prior to a given maintenance event such as a software update, a given FMS node may store its latest state tracking entries at a shared storage device accessible to one or more other nodes as also discussed below in further detail.

After the STEs 140 have been initialized for flow F1 in response to the initial data packet of F1, state management of subsequent packets of the flow may be handled by the primary FMS node for the respective directions of the flow. In some embodiments, the nodes 130 may also be responsible for performing the requested packet transformations and transmitting received packets towards destinations selected based on the transformation descriptors 150. In other embodiments, other nodes of the FMS may be designated as packet transformation nodes, and may transform the packets based on the transformation descriptors (which may be propagated from the state tracking nodes to the packet transformation nodes). If a condition for which an intervention is specified in the metadata of the state tracking entries is met, the corresponding action may be initiated in various embodiments (e.g., by the state tracking node at which the condition is detected, and/or by a node at some other tier of the FMS); otherwise, the packet may be transmitted on towards a destination selected based on the transformation descriptor without initiating the action.

Phases of Flow Management

Figure 2:
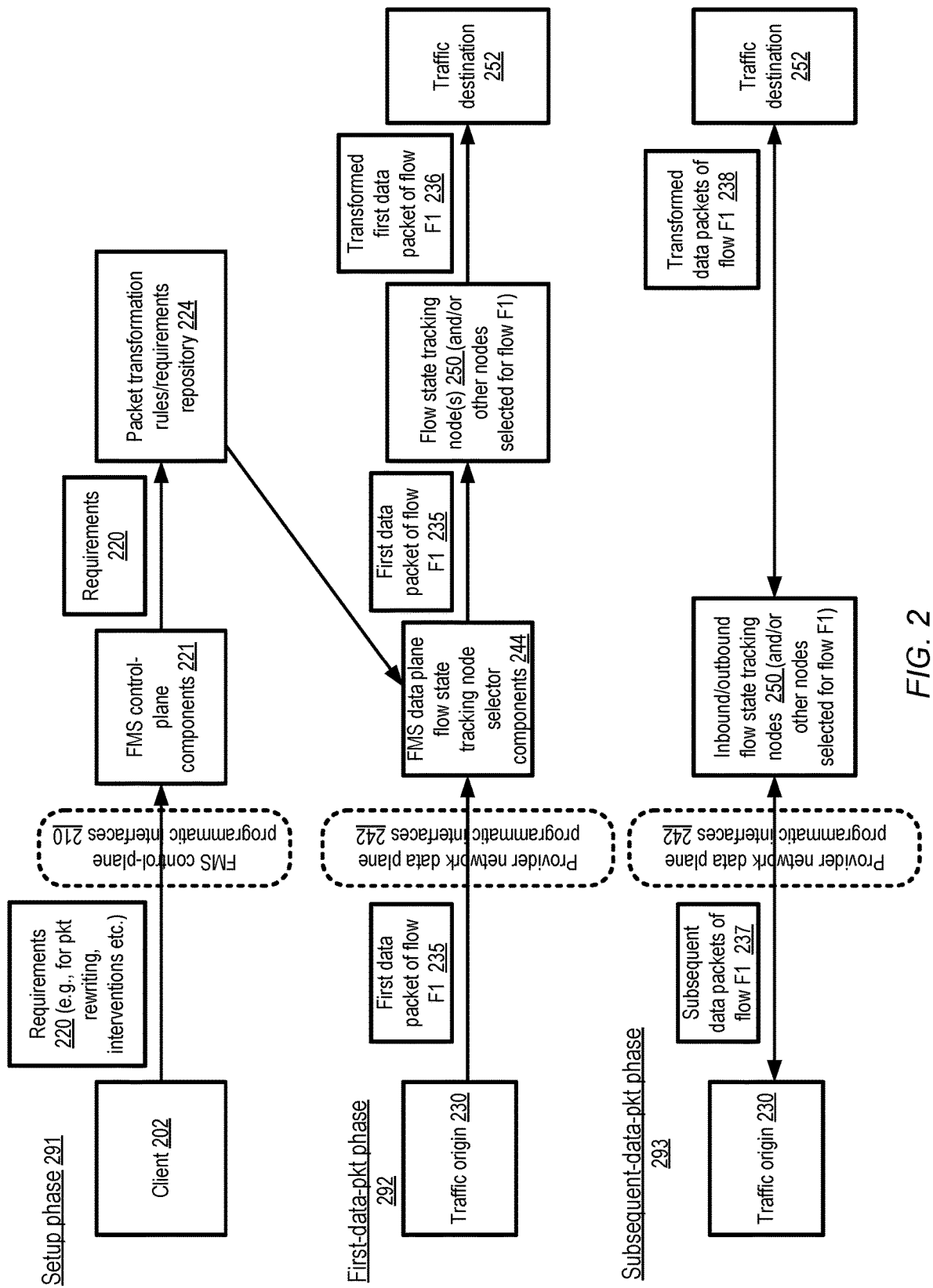
FIG. 2 illustrates an overview of example phases of network flow state management, according to at least some embodiments.

FIG. 2 illustrates an overview of example phases of network flow state management, according to at least some embodiments. In a setup phase 291, flow management requirements 220 (e.g., for packet rewriting, interventions to be undertaken under specified conditions, etc.) may be submitted by a client 202 to control plane components 221 of the flow management service via FMS control-plane programmatic interfaces 210 in the depicted embodiment, and the requirements may be stored as rules in a repository 234. A variety of control plane programmatic interfaces 210 may be implemented by the FMS in different embodiments, such as a web-based console, a set of application programming interfaces (APIs), command-line tools, graphical user interfaces and the like.

In first-data-packet phase 292 of the flow, the first data packet 235 of a given flow F1 may be submitted from a traffic origin device 230 via data plane programmatic interfaces 242 of a provider network service. This second set of programmatic interfaces may also comprise, for example, one or more of a web-based console, a set of APIs, command-line tools, graphical user interfaces and the like in different embodiments. An FMS data plane flow state tracking node selector component 244 may determine that a rule for the flow F1 exists in repository 224, and direct the first data packet to a flow state tracking node 250 identified for F1, e.g., based on hashing one or more elements of the flow identification tuple. The set of inbound/outbound flow state tracking nodes for the flow F1 may be selected at this stage, e.g., using the kinds of techniques discussed above, and state tracking entries may be set up at the nodes in response to the submission of the first data packet in the depicted embodiment. A transformed version 236 of the first data packet 235 may be transmitted to a destination 252 in accordance with the transformation requirement of F1, e.g., from one of the flow state tracking nodes (or other FMS nodes) selected for F1.

In subsequent-data-packet phase 293, additional packets 237 of the flow F1 may be received via the interfaces 242, and transmitted to the appropriate flow state tracking nodes 250 and/or other FMS nodes selected for the flow F1. These nodes may already store the state tracking entries needed to process the packets (and update F1 metadata if necessary), and transformed versions of the packets 238 may be sent to their respective traffic destinations 252.

Multi-Tier Flow Management Service

Figure 3:
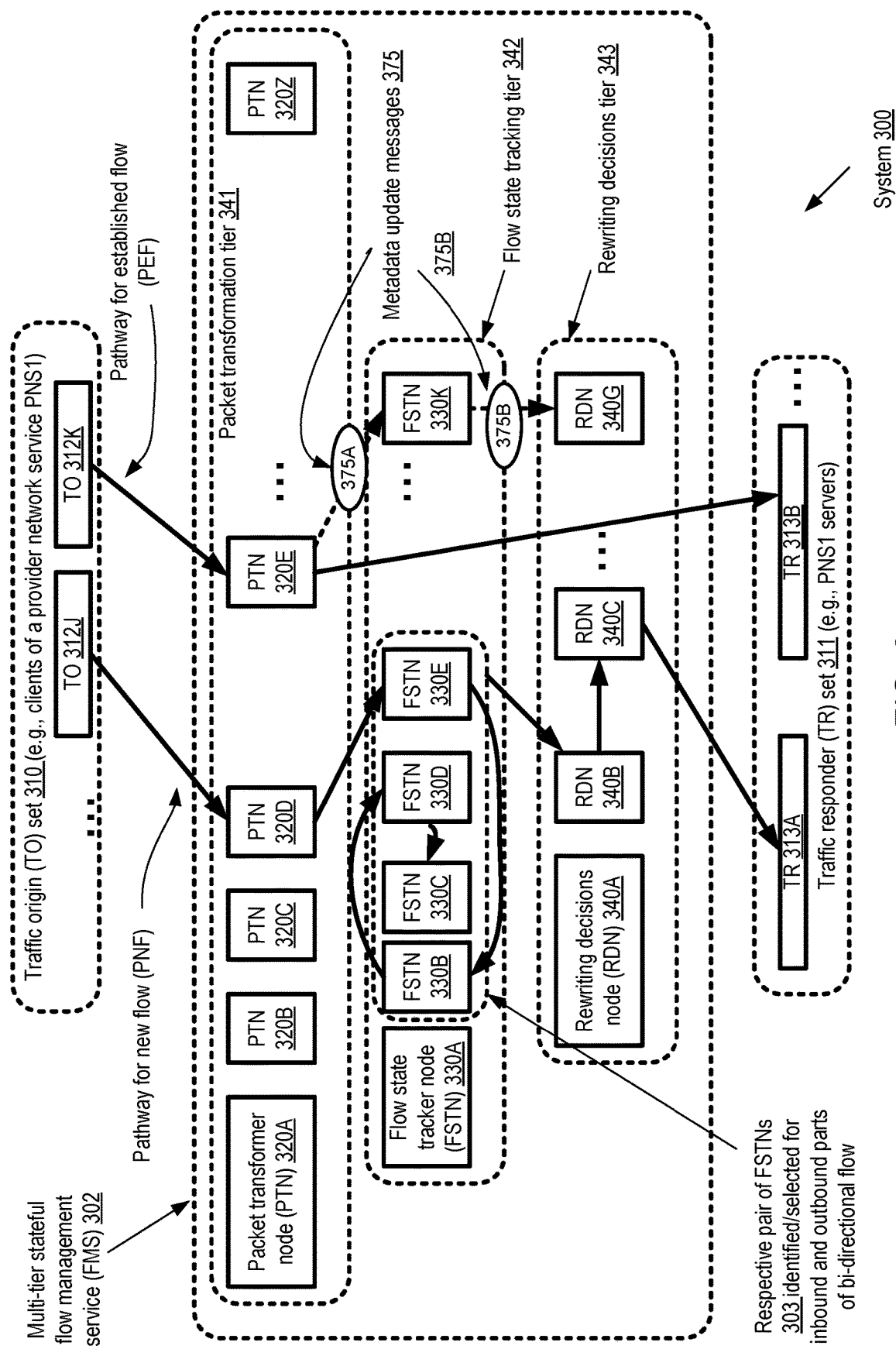
FIG. 3 illustrates an example system environment in which a multi-tier flow management service may be implemented, according to at least some embodiments.

FIG. 3 illustrates an example system environment in which a multi-tier network flow management service may be implemented, according to at least some embodiments. As shown, system 300 includes respective collections of nodes of a packet transformation tier 341, a flow state tracking tier 342, and a packet rewriting decisions tier 343 of a flow management service 302. Tier 341 comprises a plurality of packet transformer nodes (PTNs) 320A-320Z, tier 342 comprises a plurality of flow state tracking nodes (FSTNs) 330A-330K, while tier 343 comprises a plurality of rewriting decisions nodes (RDNs) 340A-340G. In general, any desired number of nodes may be instantiated at any of the tiers. In some embodiments, a given node may be implemented using one or more virtual machines or compute instances instantiated at a virtualization host managed by network-accessible virtualized computing service of a provider network. In other nodes, one or more nodes may comprise a set of processes of an operating system running on an un-virtualized host. The different tiers 341, 342 and 343 may collectively be responsible for implementing a variety of packet transformation or rewriting directives on behalf of numerous clients, with each such directive being applicable to one or more flows comprising respective pluralities of packets.

A given rewriting directive may for example contain or indicate one or more specific rules. In the depicted embodiment, one packet flow may be distinguished from another based on some combination of the following attributes: the network protocol used at least for the packets received at the FMS, the source and destination addresses, the source and destination ports, and/or identification information pertaining to a client on whose behalf the packets are to be processed. For example, one or more rewriting directives may be generated and enforced in the depicted embodiment for packets originating at traffic origin set 310 (e.g., including traffic origins (TOs) 312A and 312B) and directed towards a set of traffic responders 311 (e.g., TR 313A and 313B). The traffic responders 311 may, for example, collectively implement a particular application using some set of resources of a provider network, and the traffic origins may represent client devices from which requests for that application are sent. An entity responsible for the application (e.g., a customer of the provider network) may submit a request indicating a particular type of packet processing requirement (e.g., a multicast requirement, an anycast requirement, a load balancing requirement, a source address substitution requirement, or the like) to the FMS 302, and one or more directives comprising rules to fulfill the requirement may accordingly be generated for corresponding flows of received packets.

In some embodiments, respective directives may be generated for both directions of traffic flow between two sets of endpoints: e.g., one directive may be applied for packets originating traffic originator set 310 and directed towards traffic responders 311, and another directive may be applied for packets flowing from the responders 311 to the originators 310. In other embodiments, a given rewriting directive may contain respective elements or sub-rules for each direction of traffic. It is noted that in situations in which packets in both directions are transformed by the FMS, the roles of traffic "origins" and "responders" may be switched depending on the direction—e.g., when an entity or device receives a transformed packet from the FMS in the role of a responder, that same entity may subsequently send a packet to the FMS in the role of a traffic origin. In one embodiment, at least some of the FMS nodes used for packets transmitted in one direction (e.g., from a first set of hosts to a second set of hosts) may differ from the FMS nodes used for packets transmitted in the reverse direction (from the second set to the first set). For example, at least one node of the packet transformation tier, the flow state tracking tier and/or the rewriting decisions tier which participates in the process of transforming and routing packets flowing in one direction may not necessarily be used for packets flowing in the reverse direction. In some embodiments, at least at one of the FMS tiers, there may be no overlap between the respective fleets of nodes used for the different directions of traffic.

Two examples of the paths that may be taken when responding to a packet received at the packet transformation tier are indicated in FIG. 3 to help explain the respective functions of the different tiers. The arrows labeled "PNF" (pathway of a new flow) represent the operations and messages that may result when the first packet of a particular flow (i.e., a flow for which a specific packet rewriting directive has not yet been generated, but for which a client has submitted a request indicating the kind of transformation to be applied) is received at the FMS. From among the packet transformation nodes 320A-320Z, a particular subset may be selected for a given client's packet processing requirement. One of the nodes from the subset (e.g., PTN 320D) may be selected for the first packet of a new packet flow originating at TO 312J, as indicated by the arrow PNF-1. PTN 320D may examine its local cache of entries containing transformation rules, and determine that no entry applicable to the new flow exists in the cache. Such entries may also be referred to as rewrite entries in various embodiments. PTN 320D may then identify a particular FSTN 330E of tier 342 to which a cache miss indicator is to be sent.

Upon receiving the cache miss indicator FSTN 330E may discover that it does not have any local state tracking entry (STE) (a data structure which may include the rewriting rules as well as associated metadata) for the new flow. Before any of the packets of the flow are transmitted to intended destinations among the traffic responders, in at least some embodiments a plurality of FSTNs may be identified for managing state information of the new flow. For example, FSTN 330E may be designated as a primary FSTN for the inbound traffic of the flow, FSTN 330B may be designated as the secondary for inbound traffic, FSTN 330D may be selected as the primary for outbound traffic (from the TRs to the TOs), and FSTN 330C may be selected as the secondary for the outbound traffic of the flow. In at least some embodiments, the nodes of at least some FSTN pairs 303 associated with a given flow may be selected from among a pool of FSTNs set up at tier 342, e.g., using a deterministic mapping from the flow identifier, by other FSTN nodes—e.g., the inbound primary may select the inbound secondary, the inbound secondary may select the outbound primary, and/or the outbound primary may select the outbound secondary. In at least some embodiments, health state information regarding the nodes at various tiers, captured by health monitoring fleet 350, may also be used to select at least some of the nodes to be used for a given flow at one or more tiers In some embodiments, one or more nodes 340 of the rewriting decisions tier 343 may be informed regarding the first packet, and such nodes may look up the client-specified packet transformation requirements to generate the specific transformation directives to be implemented at other layers of the FMS. For example, rewriting decisions node (RDN) 340B may be notified by FSTN 330E that the first packet of a flow has been received. In some embodiments, RDN 340B may look up the details of the client requirement associated with the new flow (e.g., by querying a control-plane component of the service being used to implement the targeted application at the traffic responders). RDN 340B may generate a new directive corresponding to the requirement. The directive may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets are to be changed, and so on.

The newly-generated directive may be transmitted from RDN 340B to a different RDN such as 340C for replication in the depicted embodiment. More than two replicas may be stored at respective RDNs in some embodiments, e.g., to increase the resiliency of the FMS to failures. In some embodiments, the RDN at which the replica is stored may transmit the directive back to the flow state tracking tier, where a local copy of the directive may also be stored, e.g., as part of the state tracking entry, in at least some embodiments. In one implementation, the directive may also be replicated at multiple FSTNs designated/selected for the flow. In the depicted embodiment, the directive may be transmitted to PTN 320D, where an entry representing the directive may be stored in a local cache. The first packet of the flow may be transformed per the directive and transmitted towards its destination TR 313A, e.g., by one of the RDNs selected for the flow (e.g., RDN 340C) as shown in the depicted embodiment, or by one of the nodes at the other tiers (e.g., PTN 320D or FSTN 330E) in other embodiments. In some embodiments, a response to the transformed packet or packets may be received at the packet transformation tier (e.g., at PTN 320D or at a different PTN to which the response packet is directed from TR 313A). If transformations are required to the response packets, they may be applied (e.g., using one or more elements of the same directive that was generated earlier in response to the cache miss) at tier 341, and the transformed response packets may be sent on to the traffic origin TO 312J.

The second example pathway illustrated in FIG. 3 is for a packet of an established flow—i.e., a flow for which a rewrite directive has already been generated and propagated to one or more nodes of tier 341 at which the directive is to be applied. The arrows associated with this second flow are labeled PEF (pathway for established flow). As shown, a packet of the established flow may be transmitted from a traffic origin 312K to PTN 320E. There, a rewrite entry for the flow may be found in the local cache. One or more outbound packets corresponding to the received packet of the established flow may be generated according to the cached entry, and send to a destination TR 313B in the depicted embodiment. If and when additional packets of the established flow are received at PTN 320E, the directive may be reapplied, e.g., without further interactions with tiers 342 or 343. In at least one embodiments, at least some nodes at one or more tiers of an FMS, including the flow state tracking tier, may be implemented in multi-tenant mode. Thus, for example, a given FSTN, PTN and/or RDN may be used for managing a number of flows of different clients.

In at least some embodiments, the PTNs 320 may update metadata records corresponding to packets rewritten for various flows (e.g., indicating when the most recent packet of a given flow was processed as well as various other parameters discussed below in further detail) and transmit the contents of the metadata records (either in raw form, or in some compressed/aggregated form) to the FSTNs 330, as indicated by arrow 375A. Such metadata updates or refresh messages may be sent periodically in some implementations, e.g., once every K seconds, or in response to metadata update requests from tier 342. Similarly, as described below in further detail and indicated by arrow 375B, representations of flow state metadata records may be transmitted from tier 342 to tier 343 in at least some embodiments, and may be used at the RDNs to make various choices required for the rewriting directives (e.g., the particular port or IP address to be used as a substitute for a source port, or a particular destination server to which the transformed packets of a load-balanced flow should be sent). For example, updated flow metadata may indicate to an RDN that a particular (address, port) combination that was being used for a particular client's packet processing requirement is no longer in use because a connection has been closed, and that (address, port) pair may subsequently be used for some other packet processing requirement of the same client or another client.

In some embodiments, depending for example on the particular protocol being used, some of the packets received at the transformation tier may be fragmented. For example if a UDP (User Datagram Protocol) message that is 2000 bytes in size is sent to the FMS from a traffic origin with a maximum transmission unit of 1500 bytes, that message may be split across two packets or fragments. According to the UDP design, only the first fragment contains the UDP header, while the second fragment has an IP (Internet Protocol) header and a subset of the message data. Thus, a flow identification technique that relies on UDP ports (which are indicated in UDP headers) may not work for all the fragments. Furthermore, the fragments of a given message may not necessarily arrive in order—e.g., in the above example, the second fragment may arrive before the first. In order to handle UDP fragmentation, in at least some embodiments a technique that relies on using the "ID" field of the IP header may be used to associate the fragments of a given message or datagram with one another. In some embodiments, a dedicated fleet of FMS nodes (called association nodes) may be established to accumulate message fragments until the entire message has been received. After the complete message has been received, the association node may transmit the message for normal-mode FMS processing of the kind described above. In one such embodiment, when a given packet transformer node receives an IP fragment, the fragment may be directed to a selected association node. The target association node may be selected, for example, by hashing on the tuple (protocol, source IP address, destination IP address, IP ID). When the association host has reconciled all the fragments it may forward them back to the packet transformer node for standard processing of the kind described above. The forwarded fragments may be encapsulated with the full flow details (e.g., including the UDP port) so that all the flow identification information needed is available at the packet transformer node. Association nodes may be considered examples of store-and-forward nodes. In various embodiments, similar association techniques may be used for protocols other than UDP in which flow identification information may not necessarily be available in all the packets due to fragmentation.

Flow Identifiers and Rewriting Directives

Figure 4:
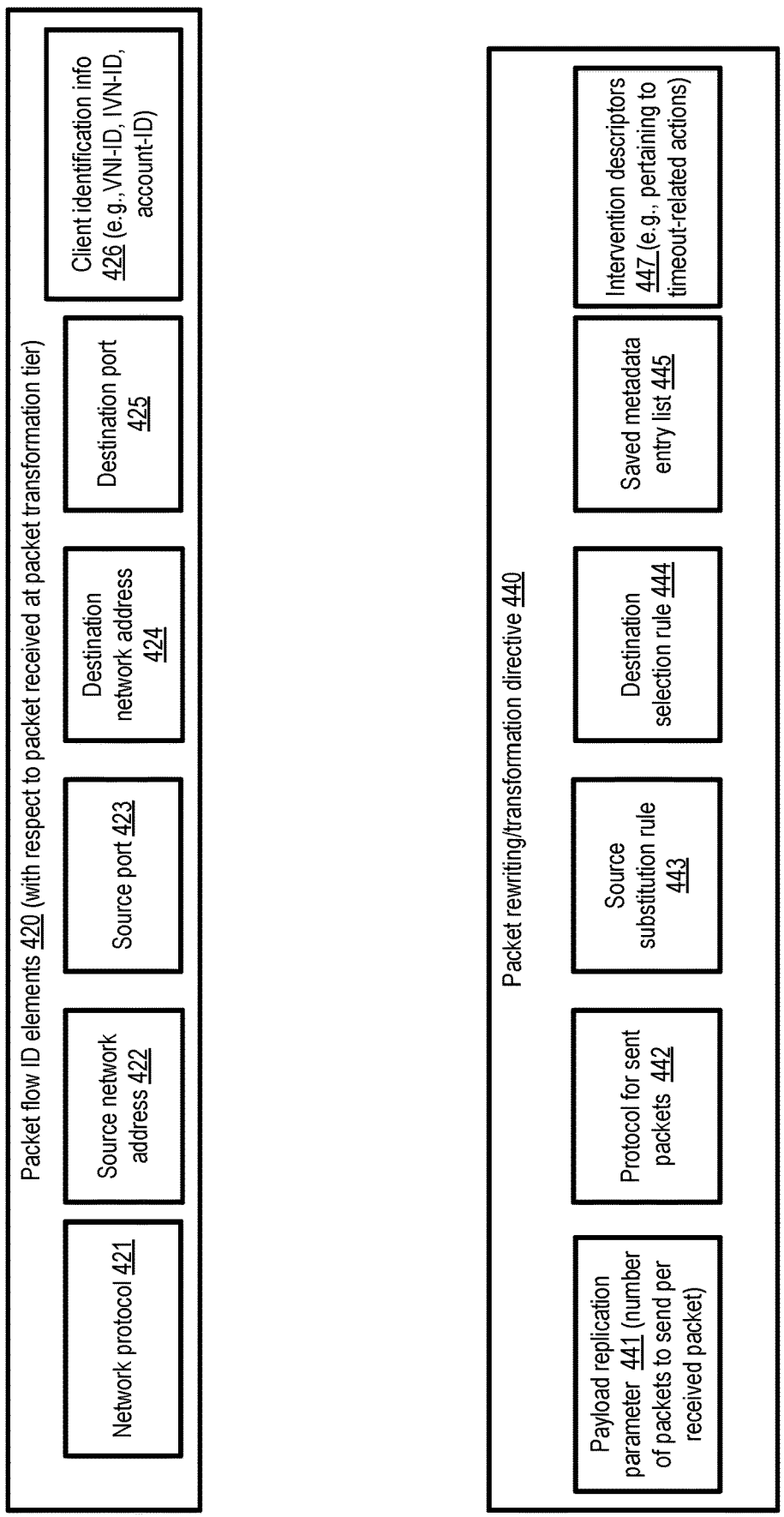
FIG. 4 illustrates examples of packet flow identifier attributes and example elements of packet rewriting directives, according to at least some embodiments.

FIG. 4 illustrates examples of packet flow identifier attributes and example elements of packet rewriting directives, according to at least some embodiments. A flow may be characterized (or distinguished from other flows) based on one or all of the following attributes of packets received at the packet transformation tier in the depicted embodiment: the network protocol 421 used for sending the packet to the packet transformation tier, the source network address 422, the source port 423, the destination network address 424, the destination port 425, and/or client identification information 426 indicative of the client on whose behalf the packet processing is being performed. Clients may be identified using a variety of data elements in different embodiments—e.g., an account identifier of an account created/registered by the client at one or more network-accessible services of a provider network may be used, an identifier of a particular virtual network interface set up for the client may be used, and/or an identifier of an isolated virtual network set up on behalf of the client may be used. A number of different networking protocols may be supported in different embodiments—e.g., including the Internet Protocol (IP), the Transmission Control Protocol (TCP), the User Datagram Protocol (UDP), the Internet Control Message Protocol (ICMP) and the like. The particular combination of attributes 421-426 that are used to distinguish one flow from another for a given packet processing requirement or client may be referred to collectively as packet flow identifier elements 420. As mentioned earlier, the process of selecting a particular node from among the nodes of a flow management service's tier for a flow may include the use of deterministic mapping functions, such as flow hashing functions, in some embodiments. Some or all of the packet flow identifier elements of a given packet may be aggregated (e.g., via concatenation or using some other function) in some implementations, and the result of the aggregation may be provided as input to a selected hash function, with the output of the hash function used to select the particular node.

The flow management service may support a variety of packet transformations in the depicted embodiment. A packet rewriting directive 440 produced at the rewriting decisions tier of the flow management system and implemented/enforced at the packet transformation tier and/or the flow state tracking tier may include any combination of several elements or parameters. The particular set of parameters used for a given client requirement may differ from the particular set of parameters used for a different requirement of the same client (or from the parameter set used for some other client's requirement). A payload replication parameter 441 may indicate how many replicas of a given received packet's contents or body are to be transmitted to respective destinations—e.g., if a multicast protocol is to be implemented by the FMS for a given client and the destination multicast group contains eight endpoints, the payload replication parameter may indicate that eight replicas are to be transmitted. By default, e.g., if the payload replication parameter is not included in the directive 440, a single outbound or transformed packet may be generated corresponding to each received packet. For some packet processing applications, the FMS may act as a protocol translator—e.g., incoming packets may be received via a particular networking protocol (such as TCP), while corresponding outgoing packets may be sent via a different protocol (such as UDP). The protocol for sent packets parameter 442 may indicate whether such a protocol change is to be implemented, and if so, the specific protocol to be used for the transformed packets. Source substitution rule 443 may indicate whether the source address and/or source port are to be changed, and if so, the acceptable source (address, port) range to be used for the transformed packets. Similarly, destination selection rule 444 may indicate whether the destination address and/or port is to be changed as part of the packet transformation, and if so, what the acceptable destination addresses and/or ports are for the flow for which the directive 440 was generated. In some cases (e.g., for multicast), multiple destinations may be indicated corresponding to a given received packet. In some embodiments, as mentioned earlier, a number of metadata elements may be updated and stored for various flows at one or more tiers of the flow management service, and representations of the metadata entries may be sent periodically or on demand to other tiers of the flow management service. The particular kinds of metadata to be collected for a given flow (e.g., including various types of performance metrics, measures of intra-packet intervals, etc.), may be indicated via saved metadata entry list 445 in the depicted embodiments.

In at least one embodiment, a directive 440 may also include one or more intervention descriptors 447, indicating for example one or more triggering conditions to be checked by the FMS with respect to the flow, and corresponding actions to be initiated if the conditions are satisfied. In some embodiments, for example, the intervention descriptor may indicate that if the length of the interval since the last packet was transmitted in a particular direction of a bi-directional flow exceeds a threshold, one or more control packets are to be transmitted towards a source and/or destination of the flow to keep the connection alive. In some embodiments, at least some of the packet rewriting directives 440 may not include all the different elements shown in FIG. 4, and/or elements not shown in FIG. 4 may be included in one or more directives. In various embodiments, some or all of the components of a rewrite directive may be cached at one or more tiers of the FMS, e.g., as part of a larger state tracking entry as described below.

Example State Tracking Entry Contents

Figure 5:
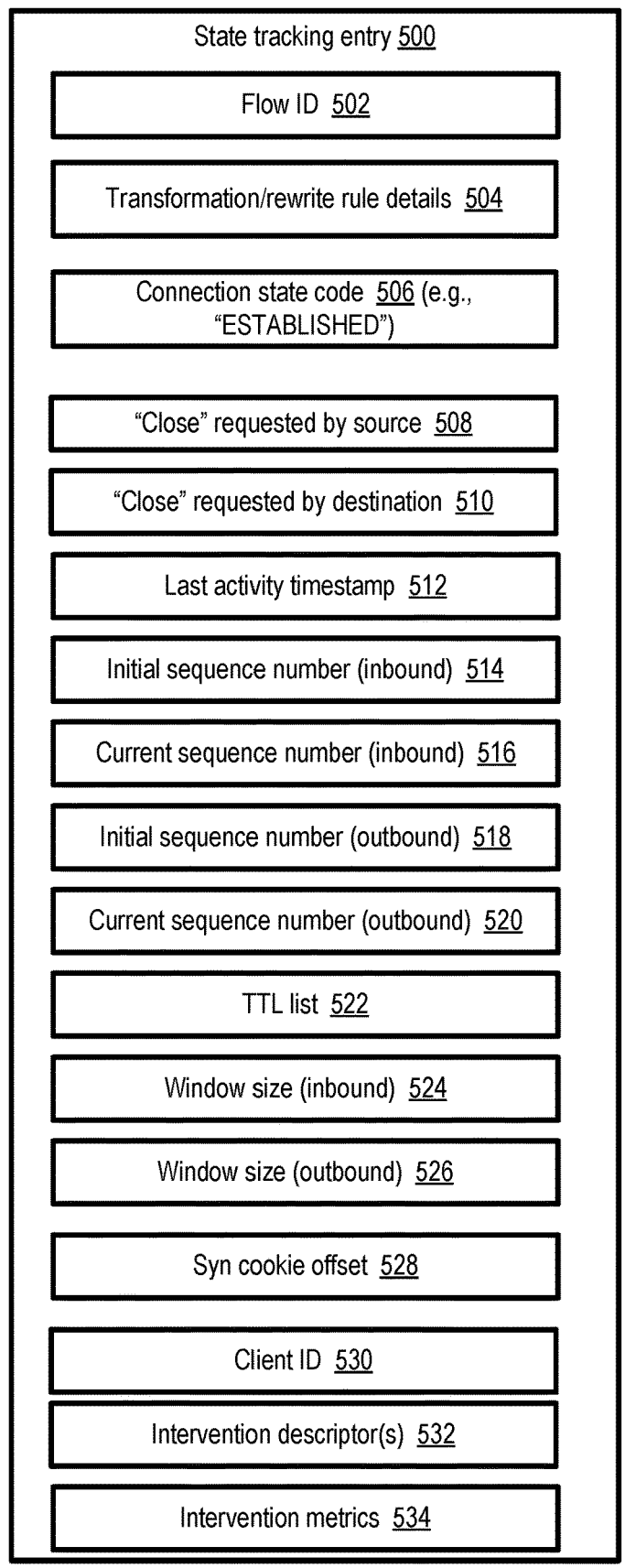
FIG. 5 illustrates example elements of a state tracking entry pertaining to a particular flow, according to at least some embodiments.

FIG. 5 illustrates example elements of a state tracking entry pertaining to a particular flow, according to at least some embodiments. In some embodiments, such entries may also be referred to as connection tracking entries. State tracking entry 500 may be generated for a particular flow, and elements of the corresponding flow identifier 502 may be explicitly or implicitly indicated within the entry in some embodiments. An indication of the category of packet transformation being implemented for the flow (e.g., multicast, anycast, etc.) and the details of the rewriting directives (e.g., the particular source or destination addresses to be used for the transformation packets, etc.) to be implemented may be stored in element 505 in the depicted embodiment. In at least some embodiments, a code 506 indicating the current protocol-specific state of the connection (e.g., TCP's "ESTABLISHED" state) may be included in the entry. Respective indications 508 and 510 as to whether either the source or destination has requested a "close" of a connection established between them may be included in state tracking entry 500 in the depicted embodiment. A last activity timestamp 512 may be included in the rewrite entry in some embodiments, which may for example be useful in cache replacement operations if an LRU algorithm is being used, and may also be useful in detecting whether a particular flow may have reached a state requiring intervention (e.g., if no activity has been observed for a long time).

A number of entries with respect to sequence numbers which may be used in some networking protocols may be included in the rewrite entry 500 in some embodiments. These entries may include, for example, the initial and current sequence numbers 514 and 516 respectively for inbound packets (e.g., packets received at the FMS from the sources or traffic origins associated with the flow), as well as the initial and current sequence numbers 518 and 520 for outbound packets (e.g., packets received at the FMS from traffic responders).

In some embodiments, the rewrite entries may also include metadata elements which can be used to detect and/or respond to one or more kinds of denial of service attacks. The IP TTL (time-to-live) value is a measure of how many hops a packet has traversed to reach the FMS. For the vast majority of legitimate flows, the IP TTL is very unlikely to change among the different packets of a given flow. For a small fraction of legitimate flows, there may be a few distinct TTL values. Thus, by tracking up to some small number N (e.g., four) unique IP TTL values per flow and rejecting packets with other TTLs, it may be easy to filter out packets associated with at least some types of denial of service attacks. Accordingly, a TTL list 522 with some configurable number of distinct TTL values seen for the flow may be maintained in the rewrite entry 500 in some embodiments. A denial of service attack may sometimes involve so-called "ACK Floods", in which large numbers of TCP packets with their "ACK" bits set may be sent to the FMS. ACK floods may be handled at least in part by dropping packets that do not have a matching rewrite entry in some embodiments. It may possible to make this defense more effective by also tracking the TCP window size in either direction (e.g., using entries 524 and/or 526 in the depicted embodiment), and rejecting packets that are too far from the valid TCP transmission window. Denial of service attacks may also comprise illegitimate TCP SYN packets in some cases. Mitigating this type of attack may include responding to SYN packets with "SYN cookies". SYN cookies are SYN|ACK response packets that have a cryptographically generated sequence number. Denial of service attackers may typically ignore this response, but a legitimate sender (i.e., an entity that is not participating in a denial of service attack) may typically reply to it. If and when a reply to such a SYN/ACK response packet is received, the sender may be deemed to be legitimate. In at least some embodiments, a SYN cookie offset 528 may be included in a rewrite entry 500 to enable the FMS to modify the sequence and/or acknowledgement numbers of transformed packets in accordance with the use of a SYN cookie.

In the embodiment depicted in FIG. 5, client identifier information 530 (e.g., an account identifier or customer identifier, virtual network interface identifier, or an isolated virtual network identifier associated with the sources and/or destinations of the flow) may also be maintained in the state tracking entries. In some implementations in which at least some of the packets received at the FMS include such client identifiers, the FMS nodes may verify that the client identifiers in the received packets match those stored in the state tracking entry 500, and may reject packets which do not indicate the expected client identifier.

In some embodiments, as mentioned earlier, clients may indicate various types of intervention actions to be implemented if or when a particular flow reaches a specified state. Such intervention requirements may be stored in one or more intervention descriptors 532 of a state tracking entry in the depicted embodiment, together with intervention-related metrics 534 (e.g., how often various types of intervention actions have been initiated for the flow).

It is noted that in various embodiments, one or more of the elements shown in FIG. 5 may not be stored in the state tracking entries—e.g., if defending against denial of service attacks is not a priority for some FMS customers, the TTL list, window size, or SYN cookie offset may not be required in the corresponding rewrite entries. The particular kinds of metadata to be included in the state tracking entries associated with a given packet processing requirement may be determined in some embodiments based on control-plane interactions with FMS clients.

Portfolio of Packet Processing Techniques

Figure 6:
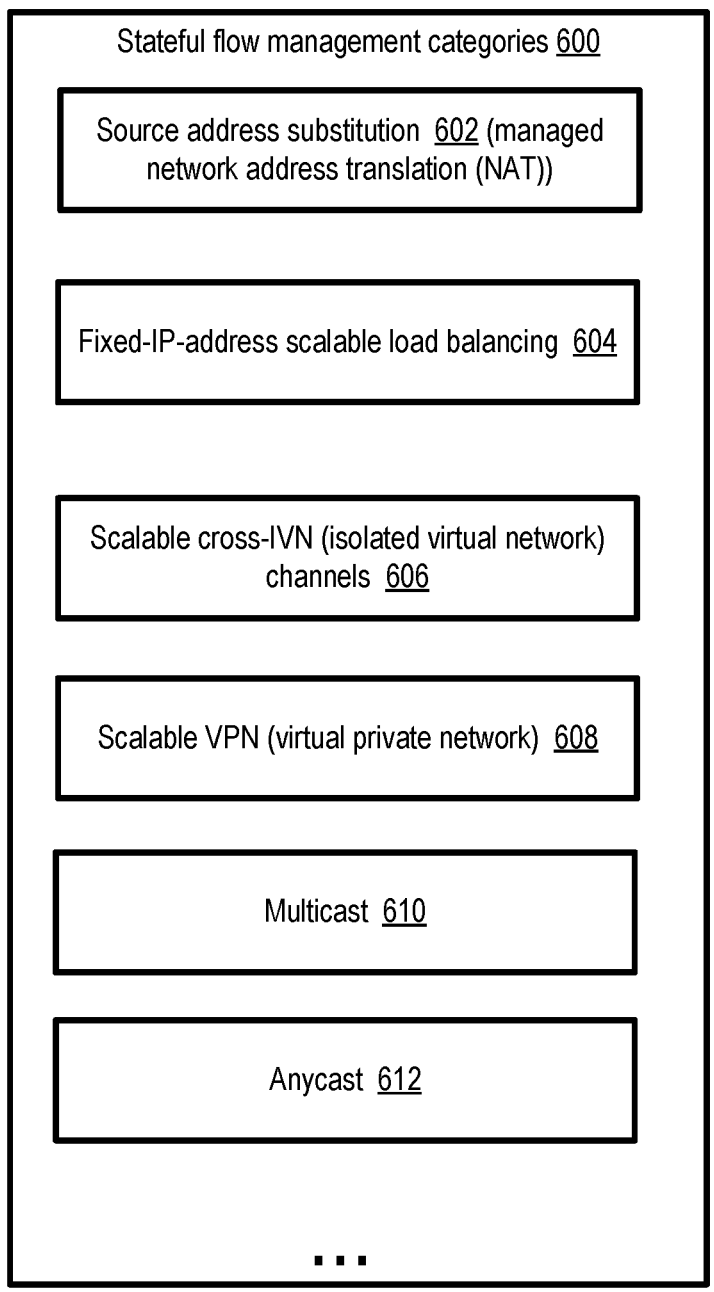
FIG. 6 illustrates example categories of packet processing that may be supported at a flow management service, according to at least some embodiments.

FIG. 6 illustrates example categories of packet processing that may be supported at a flow management service, according to at least some embodiments. As shown, the portfolio 600 of supported types of stateful flow management in the depicted embodiment may include, for example, source address substitution 602 (which may also be referred to as managed network address translation (managed NAT)), fixed-IP-address scalable load balancing 604, scalable cross-IVN (isolated virtual network) channels 606, scalable VPN (virtual private network) 608, multicast 610, stateful anycast 612, and the like. Other types of packet processing applications may be supported in various embodiments. In general, the flow state management system may be configurable to implement any desired type of packet transformations, with nodes being assignable dynamically at one or more tiers to support a large range of traffic rates in a transparent and scalable manner.

Source address substitution, as the name suggests, involves replacing, for the packets of a particular flow, the source address and port in a consistent manner. Fixed-IP-address load balancing allows a particular IP address to be continue to be used as a load balancer address for an application, despite replacements of the virtual and/or physical machines being used as the load balancer by other load balancers. Further details regarding the manner in which flows are managed at an FMS with respect to source address substitution and load balancing are provided below, e.g., in the context of FIG. 7 and FIG. 8.

In some embodiments, the flow management service may be implemented at a provider network in which isolated virtual networks can be established on behalf of various customers or clients. For example, an isolated virtual network (IVN) may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN. In various embodiments, the flow management system may act as intermediary or channel between the private address spaces of two or more different IVNs, in effect setting up scalable and secure cross-IVN channels 606. In at least some embodiments, the flow management service may also or instead be used to support scalable VPN connectivity 608 between some set of resources within a provider network and one or more client networks or client premises outside the provider network.

Generally speaking, multicast 610 is a networking technique in which contents (e.g., the body) of a single packet sent from a source are replicated to multiple destinations of a specified multicast group. In contrast, stateful anycast 612 may involve selecting, for all the packets of a given flow that are received at the flow management service, a particular destination from among a specified set of destinations (e.g., regardless of workload level changes).

Example Packet Transformations Implemented Using a Flow Management Service

Figure 7:
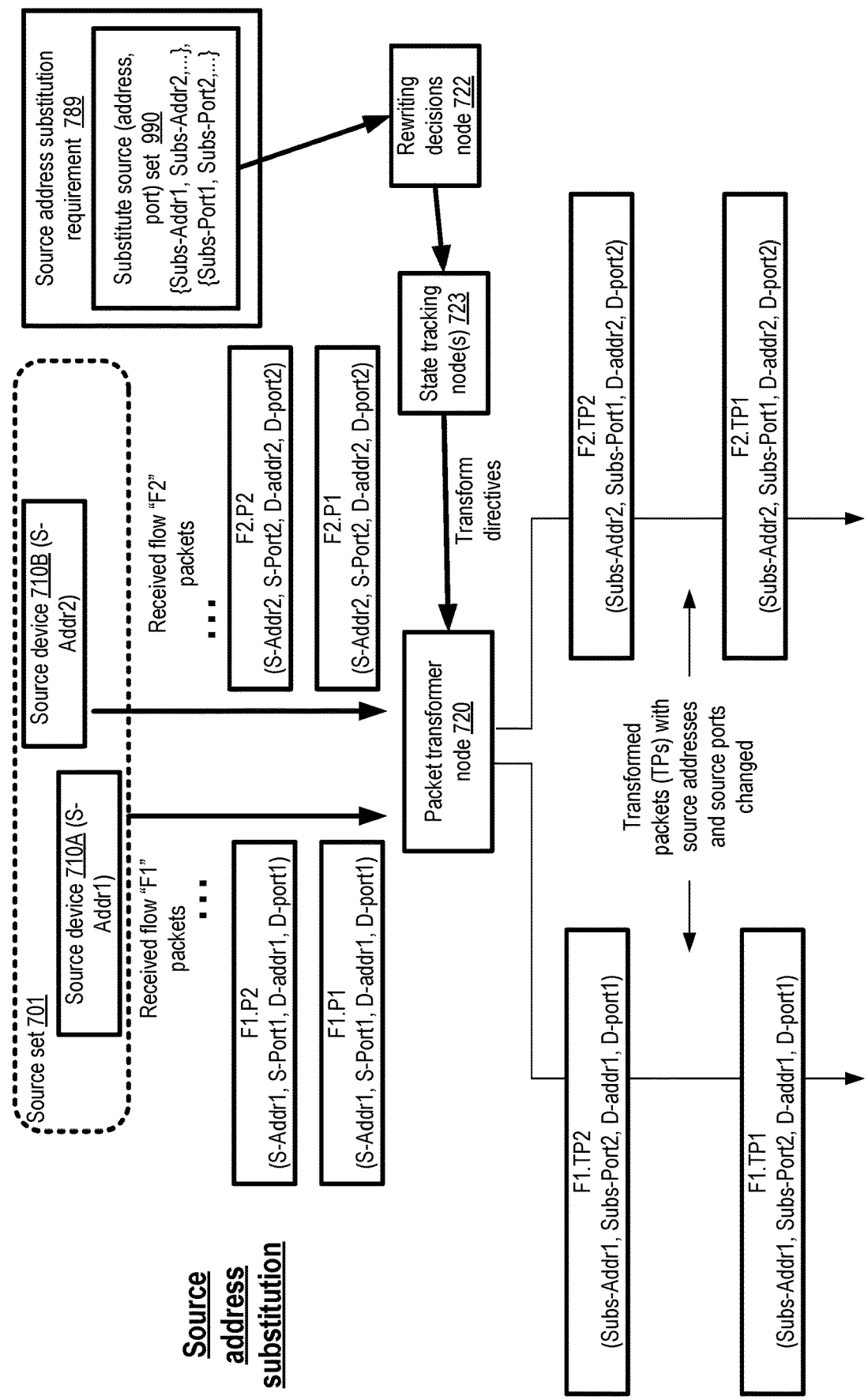
FIG. 7 illustrates an example implementation of a stateful source address substitution technique at a flow management service, according to at least some embodiments.

FIG. 7 illustrates an implementation of a stateful source address substitution technique at a flow management service, according to at least some embodiments. In the depicted embodiment, a client of the flow management services has requested that packets that originate at a source set 701, e.g., comprising devices such as 710A (with IP address S-Addr1) and 710B (with IP address S-Addr2) are to be transformed such they appear (to their destinations) to have originated from a different IP address and port combination. For example, source address substitution requirements 789 accessible to a rewriting decisions node 722 may indicate a set 790 of substitute (address, port) options, and a unique substitute source address and port pair may be selected for each flow by the rewriting decisions node 722. A rewriting directive corresponding to that selected pair may be propagated to one or more state tracking nodes 723, where the directive may be stored as part of state tracking entries pertaining to the flows. The directives may also be transmitted to one or more packet transformer nodes 720 in the depicted embodiment, e.g., by the state tracking nodes 723 or the rewriting decisions node 722.

Based at least in part on the directive, the transformed packet F1.TP1 and F1.TP2 corresponding to received packets F1.P1 and F1.P2 respectively may each be provided a source address Subs-Addr1 and source port Subs-Port1, for example. Similarly, the source address and port for each transformed packet of flow F2, such as F2.TP1 and F2.TP2 may be set to Subs-Addr1 and Subs-Port2 in the example scenario shown. It is noted that for some packets, depending on the contents of substitute set 790 relative to the actual source of the packets, only the source port or only the source address may have to be changed. The destination address and port (e.g., D-addr1 and D-port1 in the case of F1 packets, and D-addr2 and D-port2 in the case of F2 packets) may remain unchanged in the scenario depicted in FIG. 7. It is noted that techniques involving changes to destination addresses (such as anycast, multicast and/or load balancing) may be applied together with source address substitution for some client requirements, in which case both the source and destination (address, port) combinations may be changed based on the rewriting directives.

Figure 8:
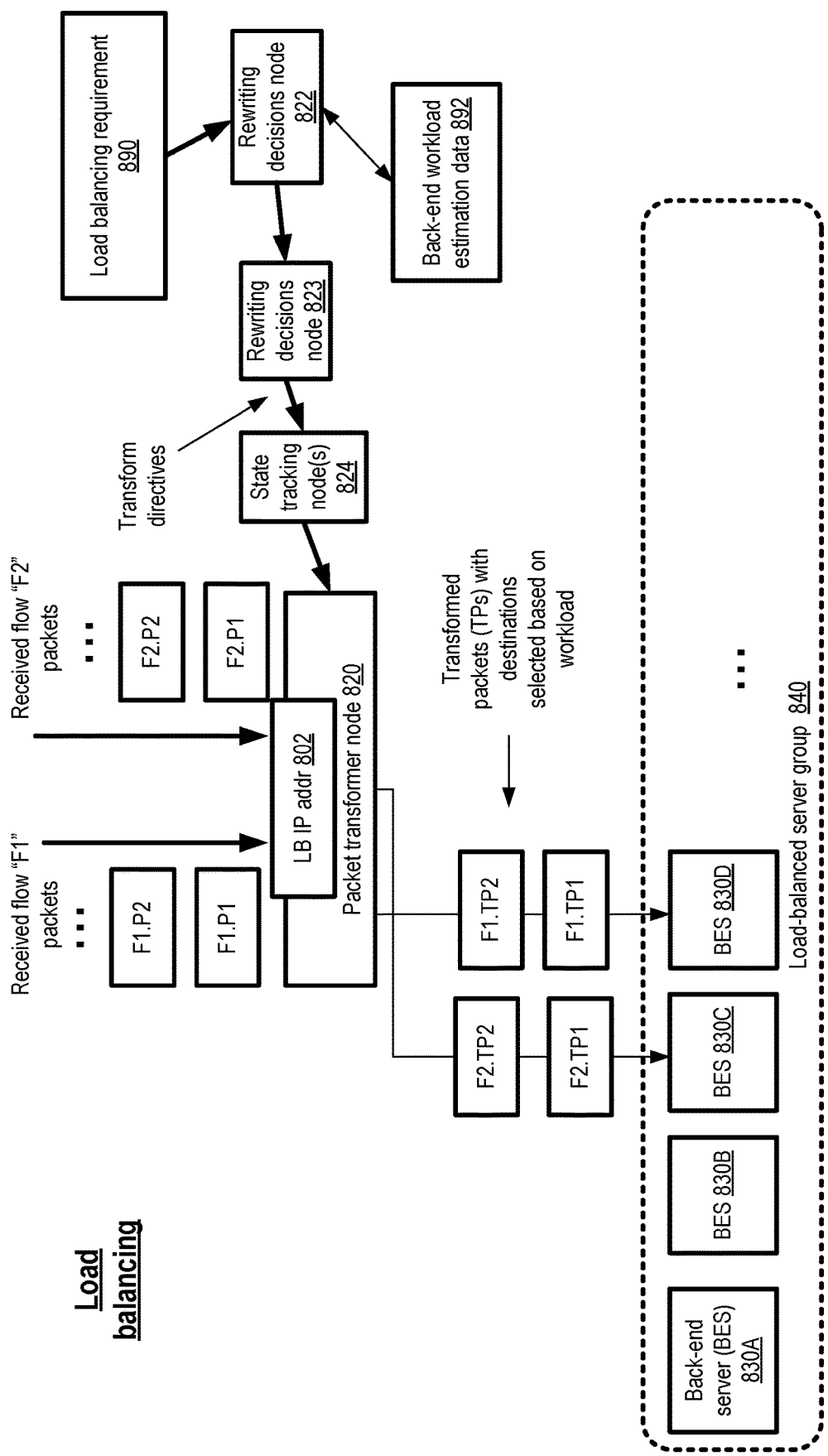
FIG. 8 illustrates an example implementation of a load balancing technique at a flow management service, according to at least some embodiments.

FIG. 8 illustrates an implementation of a load balancing technique at a flow management service, according to at least some embodiments. In the depicted embodiment, upon encountering the first packet of a given flow directed to an IP address 802 designated for a load balancer, rewriting decisions node 822 may select a particular back-end server (BES) 830 (e.g., any one of BESs 830A-830D) based on some information or estimate 892 of the relative workload levels of the different BESs of a server group 840. The particular load balancing technique used, and/or the sources from which workload information regarding various server groups 840, may differ in different embodiments. A corresponding rewriting directive may be provided to PTN 820, e.g., via one or more state tracking node(s) 824 in the depicted embodiment. In at least some embodiments, instead of attempting to collect information from the BES groups indicated in load balancing requirement specifications 890, the rewriting decisions nodes such as 822 may maintain records of the flows they have already assigned to various back end servers 830. In other embodiments, such records may be supplemented by measurements collected from the back-end servers, or collected metrics may be used instead of records of previous decisions. In the depicted example scenario, transformed packets of flow F1 (such as F1.TP1 and F1.TP2) are directed to BES 8030D, while transformed packets of flow F2 (such as F2.TP1 and F2.TP2) are directed to BES 830C. In at least some embodiments, the rewriting directives generated for load balancing may allow a packet transformer node such as 820 to select from among several different back-end servers; that is, a rewriting directive may not necessarily enforce a selection of just one back-end server for a given flow. Instead, for example, at the time the first packet of a new flow Fj is received, the rewriting directive generated for Fj may indicate N different back-end servers which appear to be lightly loaded based on the workload estimation data 891 currently available, and the PTN 820 may select (e.g., at random) from those N servers.

As mentioned earlier, in at least some embodiments other types of packet processing techniques may be supported by a flow management service in addition to those illustrated in FIG. 7 and FIG. 8, such as scalable virtual private network support, multicast, anycast and the like. Depending on the applications for which packet transformations are needed, combinations of multiple techniques may be used in some cases: e.g., source address substitution may be combined with load balancing, anycast or multicast in some embodiments.

Flow Management in a Provider Network with Isolated Virtual Networks

Figure 9:
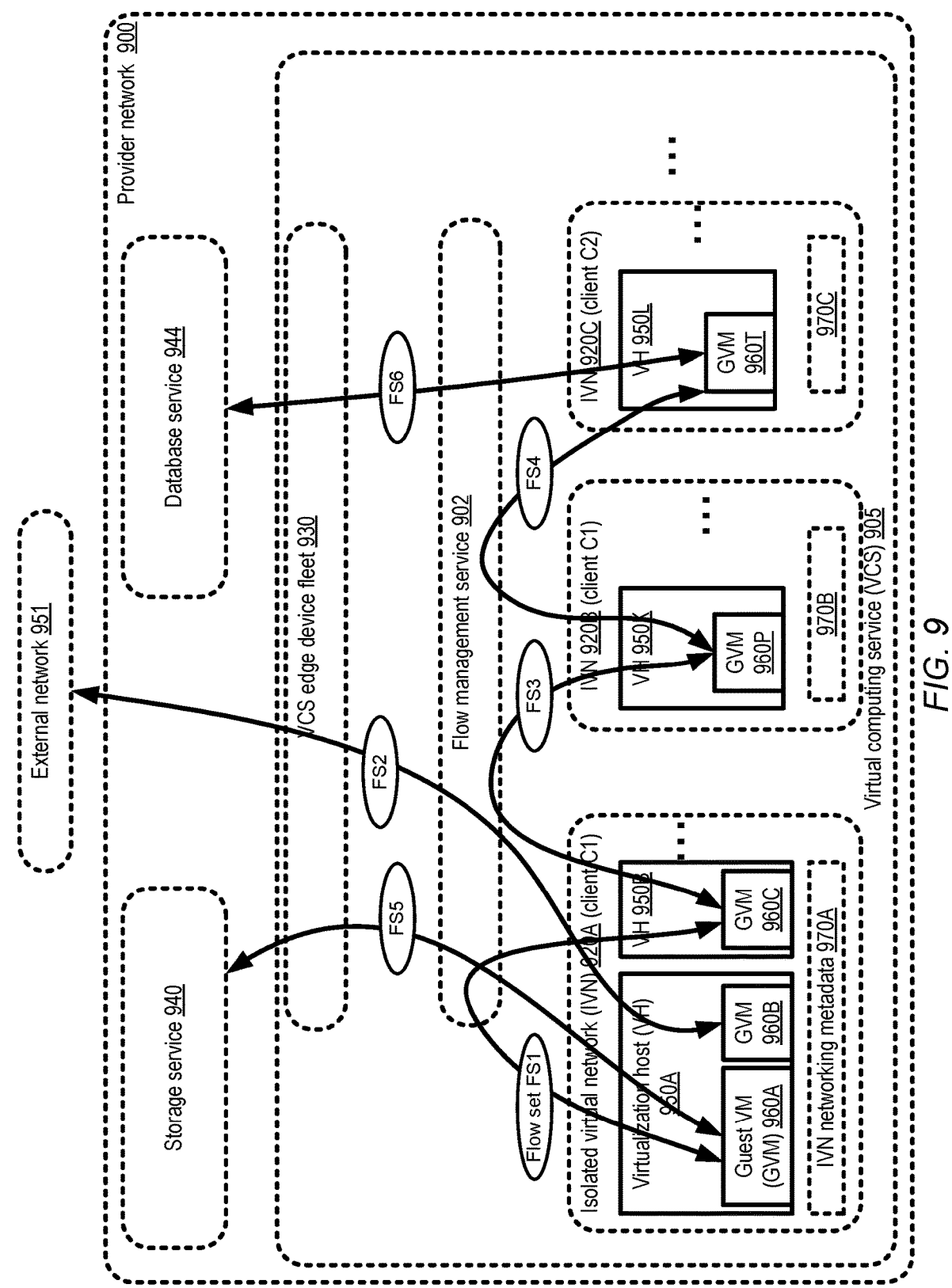
FIG. 9 illustrates examples of network flows which may originate or terminate at guest virtual machines within isolated virtual networks of a provider network, according to at least some embodiments.

In some embodiments, a flow management service may be implemented within a provider network. FIG. 9 illustrates examples of network flows which may originate or terminate at guest virtual machines within isolated virtual networks of a provider network, according to at least some embodiments. Several different network-accessible services may be implemented at provider network 900 of FIG. 9, including, for example, a virtualized computing service (VCS) 905, a storage service 940 and a database service 944. The VCS may comprise a plurality of virtualization hosts (VHs) 950, such as 950A, 950B, 950K and 950L in the depicted embodiment, at each of which one or more guest virtual machines (GVMs) 960 may be instantiated on behalf of one or more VCS clients. Each virtualization host may also include other components not shown in FIG. 9, such as a virtualization management stack (VMS) comprising a hypervisor and/or an administrative-domain operating system, with the VMS acting as an intermediary between the GVMs of the host and the hardware components of the host. In some embodiments, at least some of the virtualization management-related functionality may be offloaded from the primary CPUs of the virtualization hosts to peripheral cards, thereby enabling more of the host resources to be used for GVMs 950.

In at least some embodiments, the VCS may support the capability of setting up isolated virtual networks (IVNs) on behalf of various clients. Each IVN 920 may include a respective subset of resources of the VCS, over whose networking configuration the client is granted substantial flexibility. For example, IVN 920A (established for client C1) includes VHs 950A and 950B in the depicted embodiment, IVN 920B (also set up for client C1) includes VH 950K, and IVN 920C (set up for client C2) includes VH 950L. A given client such as C1 may establish multiple IVNs for various purposes—e.g., IVN 920A may be set up for hosting a web application for access from external networks such as network 951 (which may for example include portions of the public Internet and/or a client-owned network), while IVN 920B may be set up for the development of the web applications. Generally speaking, the VCS may allow the traffic associated with a given IVN to be isolated or separated from the traffic associated with any other IVN, unless of course the clients for whom the IVNs are established indicate otherwise. With respect to a given IVN, the client may make various networking decisions such as IP address assignment, subnet configuration and/or enforcement of security rules regarding incoming and outgoing traffic independently of the corresponding decisions made with respect to other IVNs. For example, a particular private IP address which is assigned to a GVM 960B at VH 950A of IVN 920A may also happen to be assigned to GVM 960T at VH 950L of IVN 920C. Thus, with respect to many aspects of network management, each IVN may effectively be treated by the corresponding client as a standalone network such as one which may be established at the client's private data center. Each IVN may have an associated set of networking metadata 970 in the depicted embodiment, such as 970A for IVN 920A, 970B for IVN 920B, and 970C for IVN 970C. IVNs may also be referred to as virtual private clouds in some environments.

In the embodiment depicted in FIG. 9, a flow management service 902 may be implemented at least in part for traffic originating at or directed to the guest virtual machines 960. The networking metadata 970 of an IVN may include addresses for one or more nodes of service 902 for various packet processing requirements associated with the IVN in the depicted embodiment. For example, if source address substitution is to be implemented for packets originating at GVMs of IVN 920A, in some embodiments a gateway for outbound traffic may be configured at IVN 920 specifically for those packets. The metadata 970A may include an indication of one or more IP addresses assigned to the gateway, which may be mapped to one or more packet transformation nodes of FMS 902, e.g., using virtual network interfaces. Similarly, the IVN networking metadata may include indications of the interfaces and/or addresses of the FMS which are to be used for other types of packet processing applications, including multicast, anycast and the like.

Some types of packet transformations may be required for traffic originating and terminating within a given IVN, such as flow set FS1 which comprises packets flowing between different GVMs of IVN 920A (e.g., GVMs 960A and 960C). Other types of transformations may be implemented with respect to flows (such as FS2) originating at external networks such as 950 and destined for GVMs such as 960B within one or more IVNs as indicated by the arrow labeled FS2. For example, an application may be implemented at GVM 960B, and client requests directed to that application may originate at various devices on the public Internet. Response to such requests may travel in the opposite direction—e.g., from GVM 960B to the public Internet. Request packets as well as response packets may pass through the flow management service 902 in the depicted embodiment. In at least some embodiments, a fleet of VCS edge devices 930 may be used as intermediaries between the VCS and other services or external networks 951. The VCS edge devices may be responsible for implementing an encapsulation protocol used at the VCS in some embodiments, e.g., for directing packets addressed to a particular GVM 960 to a NIC (network interface card) associated with a virtualization management stack at the GVM's virtualization host. The VCS edge devices and the virtualization management stacks at various virtualization hosts may both be considered examples of FMS client-side components in the depicted embodiment.

As mentioned earlier, in some embodiments the FSM 902 may be used as a scalable and secure channel for traffic between IVNs. For example flow set FS3 comprises packets transmitted between IVNs 920A and 920B of the same client C1 via FSM 902, while flow set FS3 comprises packets transmitted between the IVNs of two different clients (IVN 920B of client C1 and IVN 920C of client C2). In some embodiments in which the FSM 902 is to serve as a conduit between two different clients' IVNs, both clients may have to approve the establishment of connectivity before the FSM starts processing the cross-IVN packets. The FSM may also be used for packet flows between devices in different network-accessible services of the provider network in some embodiments. For example, flow sets FS5 and FS6 between IVNs of the VCS and other services such as database service 944 or storage service 940 may be processed at FMS 902 in the depicted embodiment. It is noted that not all the GVMs of the VCS may be assigned to clients of the VCS; some GVMs may be used for internal purposes in various embodiments. In at least one embodiment, as mentioned earlier, some GVMs may be used for the nodes at one or more tiers of the FMS.

In some embodiments, a virtualized computing service may enable users to associate virtual network interfaces (VNIs) with their GVMs. A VNI may comprise a logical entity with a set of networking and security-related attributes that can be attached to (or detached from) a GVM programmatically. For example, at least one IP (Internet Protocol) address "IPaddr1" may be assigned to a given virtual network interface VNI1, and security rules restricting inbound and outbound traffic may be set for VNI1. When that VNI is programmatically attached to a given GVM (GVM1) launched at a virtualization host with a physical network interface card NIC1, network packets indicating IPaddr1 as their destination address (and complying with the security rules) may be received at GVM1 via NIC1. In addition, outbound packets generated at GVM1 may indicate IPaddr1 as their source address and may be physically transmitted towards their destinations via NIC1. If VNI1 is then programmatically detached from GVM1 and attached to GVM2 (which is executing at a different virtualization host with a different physical network interface card NIC2), the IPaddr1 traffic that was previously being received at GVM1 may now be received at GVM2, with the same security rules in place. Support for virtual network interfaces may considerably simplify network configuration tasks for customers using the virtualized computing service. The sources and/or destinations of the flows managed using an FMS may comprise addresses assigned to virtual network interfaces in various embodiments.

When a new VNI is created, e.g., in response to a programmatic request from a client of a virtualized computing service which supports VNIs, a new interface identifier may be generated for it, and data a structure comprising a number of attributes of the VNI may be initialized. In some embodiments, as mentioned earlier, the identifier of a flow may include the identifiers or names of one or more virtual network interfaces of a source and/or destination. The provider network in which the VNI is to be used may comprise a plurality of logical partitions (such as the isolated virtual networks (IVNs) described earlier) in some embodiments, and the set of attributes stored for a VNI may contain a logical partition identifier in such cases. Any of several types of network addressing-related fields may be included within the set of attributes of a VNI in different embodiments. One or more private IP addresses may be specified in some embodiments, for example. Such private IP addresses, also referred to herein as non-public addresses, may be used internally for routing within the provider network (e.g., for encapsulation packets generated at various entities processing network traffic), and may not be directly accessible from outside the provider network or to at least some client applications running on GVMs. In some embodiments, at least some non-public IP addresses associated with a VNI may not be IP addresses; that is, addressed formatted according to a proprietary protocol of the provider network may be used, or addresses formatted according to a different public-domain protocol may be used.

In general, zero or more public IP addresses may also or instead be associated with VNIs in some embodiments; these IP addresses may be visible outside the provider network, e.g., to various routers of the public Internet or peer networks of the provider network. Such public IP addresses may be among the sources and/or destinations of the flows managed using the FMS in some embodiments. One or more subnet identifiers (e.g., expressed in Classless Inter-Domain Routing or CIDR format) may be included within VNI attributes in some embodiments, such as identifiers of subnets set up by a client within an IVN in which the VNI is to be used. In one embodiment an identification of a Domain Name Server (DNS) responsible for propagating address(es) associated with the VNI, or other DNS-related information may be included in the VNI attributes. In some embodiments the attributes of a VNI may include security-related properties. Some provider networks may allow users to specify rules, including for example firewall-related rules, for the types of incoming and/or outgoing traffic allowed at GVMs to which a VNI may be attached. Such rules may be termed "security groups" and identified via security group(s) fields included in a VNI attribute set. Various port and protocol restrictions may be enforced using such rules, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. A number of other attributes may be stored for individual VNIs in various embodiments.

Methods for Stateful Flow Management

Figure 10:
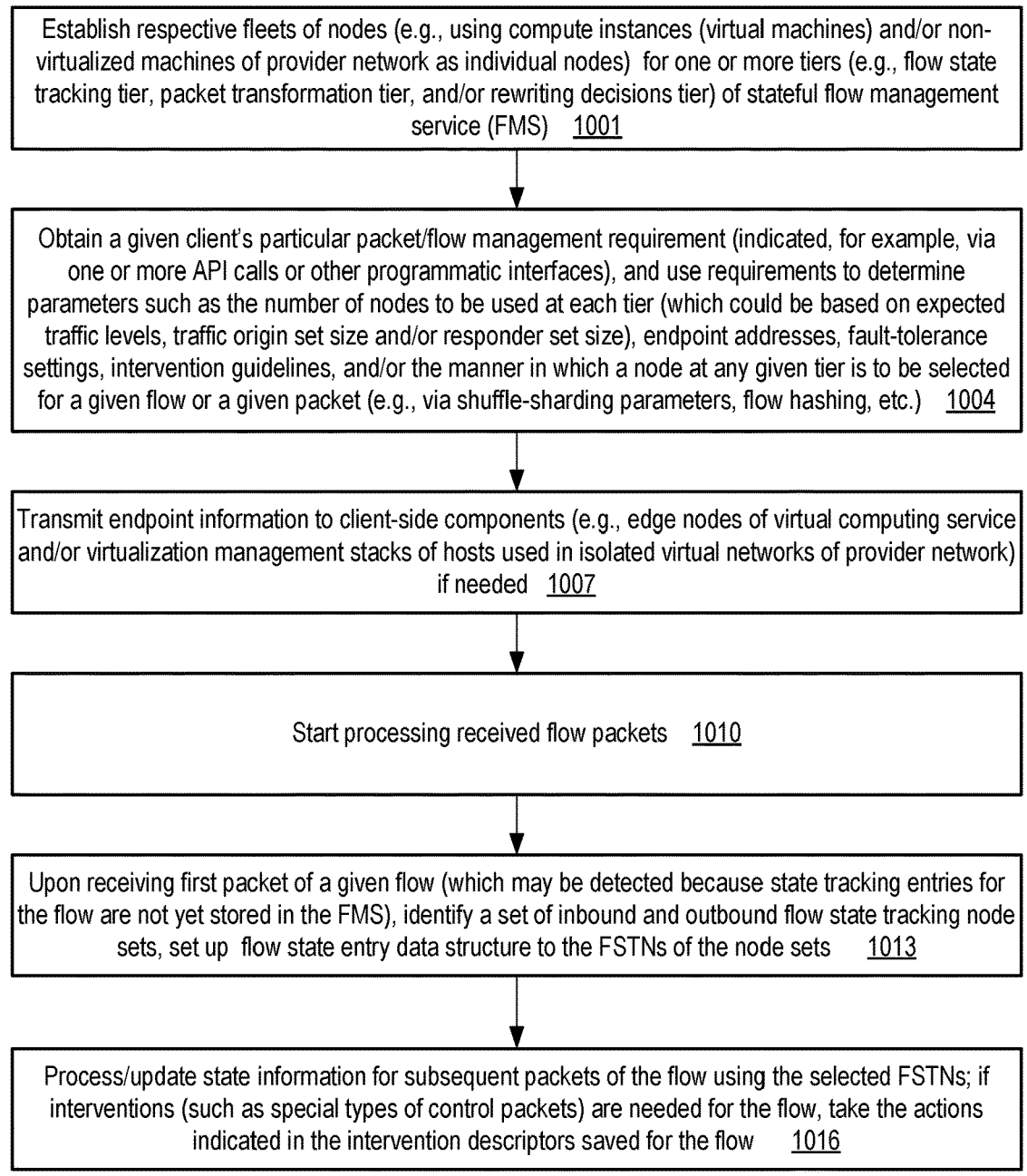
FIG. 10 is a flow diagram illustrating aspects of operations that may be performed to implement a stateful network flow management service, according to at least some embodiments.

FIG. 10 is a flow diagram illustrating aspects of operations that may be performed to implement a stateful network flow management service, according to at least some embodiments. As shown in element 1001, respective fleets of nodes may be set up for one or more tiers of the flow management service (FMS), such as the packet transformation tier, the flow state tracking tier and/or the rewriting decisions tier. In some embodiments, some or all of the nodes at one or more tiers may be implemented using virtual machines (e.g., guest virtual machines of a virtualized computing service of a provider network), while in other embodiments non-virtualized machines may be used for at least some nodes at one or more tiers.

A particular packet rewriting/transformation requirement of a client may be obtained (element 1004), e.g., as a result of an invocation of a programmatic interface of the control plane of the flow management service. A variety of programmatic interfaces may be supported in different embodiments, including for example a set of application programming interfaces (APIs), command line tools, graphical user interfaces and/or web-based consoles. A number of parameters governing the fulfillment of the requirement may be determined, e.g., from the request itself and/or from metadata pertaining to the client or the services for which the requirement is to be met. Such parameters may include, for example, the number of nodes at each tier which are designated to process the client's packets, the particular set of nodes of the fleet which are to be used for the requirement at individual tiers, the manner in which a given node is to be selected as the target for a given packet or flow (e.g., the details of the flow hashing technique to be used), the fault-tolerance technique to be used at each tier (e.g., how primary and/or secondary nodes are to be assigned, the number of replicas of rewriting decisions or state tracking entries to be stored at each tier, etc.). In at least some embodiments a particular set of endpoint addresses assigned to the packet transformation tier for the client may be identified as well. Some of the parameters (such as the number of nodes at the packet transformation tier and/or other tiers) may be selected based at least in part on an estimate of the expected packet processing rate, the size of the traffic origin set and/or the size of the responder set. In some embodiments the requirement may indicate one or more intervention requirements—e.g., conditions regarding the state of the connection which are to be monitored, and corresponding actions to be taken if a specified state is reached. Such actions may, for example, include transmitting one or more administrative or control-plane packets to an endpoint of a connection in which no traffic has flowed for a specified period, e.g., so as to extend the lifetime of the connection instead of timing out the connection.

Endpoint information (such as the network addresses associated with the packet transformation nodes to be used for the flow management operations to be performed to fulfill the requirement) may be transmitted to client-side components from which the packets are going to be transmitted to the packet transformation tier (element 1007). Such client-side components may include, for example, edge devices of a virtualized computing service and/or virtualization management components implemented at various virtualization hosts. Client-side components may also include non-virtualized hosts in at least one embodiment. In some embodiments in which at least some portions of client applications are executed within isolated virtual networks, one or more client-side components may be in an isolated virtual network, or have access to an isolated virtual network.

After the needed endpoint information has been provided to client-side components, the nodes of the FMS may start processing received packets (element 1010). If a packet which originated at one of the sources in the client's packet processing requirement message is received at a flow state tracking node (FSTN) (e.g., either from a packet transformation node which could not find a transformation rule for the packet in its cache, or from some other node), and there is not yet a state tracking entry present at the flow state tracking node, the packet may be deemed to be the first data packet of a bi-directional flow (element 1013). A respective set of one or more FSTNs to handle state information for the flow may be identified in at least some embodiments—e.g., a primary and a secondary node at respective hosts for one direction of packet transfer, and a primary and secondary node at respective hosts for the reverse direction may be selected. In at least one embodiment, the number of FSTNs used for one or both directions may be based on input provided programmatically by the client regarding the availability or fault tolerance requirements for the applications whose traffic flow is being managed, e.g., as part of the initial request for the packet processing. In various embodiments, a respective flow state tracking data structure or entry may be set up at each of the FSTNs selected for the flow. The state tracking entry may include a number of fields or elements in some embodiments, such as the packet transformation/rewriting rules to be implemented, the intervention descriptor(s), if any, and so on.

As subsequent packets of the flow are received from either the source endpoint(s) or the destination endpoint(s) of the flow, they may be transformed based on the rules and transmitted towards their intended destinations. State information for subsequent packets of the flow may be updated and/or processed at one or more of the selected FSTNs (element 1016. If interventions (such as transmissions of special types of control packets) are needed for the flow, the actions indicated in the intervention descriptors saved for the flow may be initiated in various embodiments. As noted earlier, in some embodiments, the described functionality of the packet transformation nodes and/or the packet rewriting tier nodes may be combined with the functionality of the state tracking nodes in some embodiments—e.g., the FMS may comprise only a single tier of nodes rather than multiple tiers.

Figure 11:
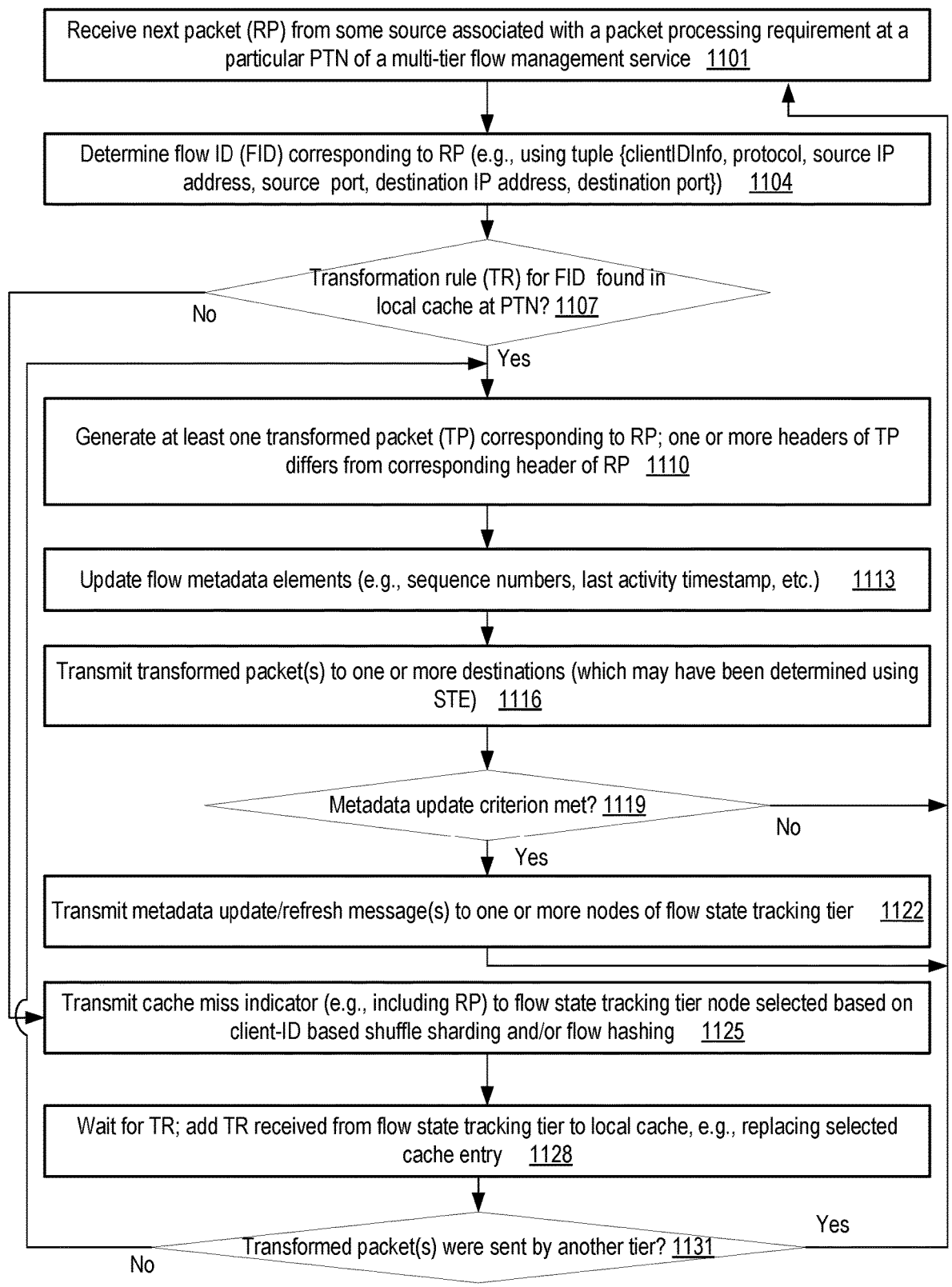
FIG. 11 is a flow diagram illustrating aspects of operations that may be performed at a packet transformation node of a flow management service, according to at least some embodiments.

FIG. 11 is a flow diagram illustrating aspects of operations that may be performed at a packet transformation node of a flow management service, according to at least some embodiments. As shown in element 1101, a particular packet (designated RP for "received packet" in FIG. 11) may be detected or received from some source associated with a client's packet processing requirement at a particular packet transformation node (PTN) of a multi-tier flow management service. As mentioned earlier, received packets may also be termed "inbound" packets with respect to the flow management service, whereas the packets sent from the flow management service after the received packets have been processed may be termed "outbound" packets. The flow identifier (FID) corresponding to the packet may be determined, e.g., using a combination of header elements of the packet such as the source and destination addresses, the source and destination ports, the protocol and/or client identification information (element 1104).

A cache lookup based on the FID may be performed, to check whether a local cache of transformation rules contains an entry applicable to RP (element 1107). If such an entry is found, at least one outbound or transformed packet (TP) corresponding to RP may be generated (element 1110) based on the rule in the depicted embodiment, such that at least one header element of TP differs from the corresponding header element of RP. Metadata associated with the flow to which FP belongs may be updated (element 1113), e.g., by changing a sequence number field, window size field, last activity timestamp field or the like within the rewrite entry. In some implementations the rules to be used to populate the header fields of the outbound or transformed packets, or to determine how many outbound packets are to be generated per inbound packet, may be stored and/or cached separately from the flow state metadata elements such as the sequence number fields, window size fields etc.

The transformed or outbound packets may be transmitted towards their destinations (which may themselves have been selected on the basis of the transform rules) from the PTN (element 1116). If a criterion for scheduling metadata update messages directed to the flow state tracking tier is met (as determined in element 1119), the PTN may transmit such a message to one or more nodes of the flow state tracking tier (element 1122). The format of the metadata update messages may differ in various embodiments—e.g., in some embodiments, a collection of state tracking entries of the kind shown in FIG. 5 may be sent, while in other embodiments summarized flow state metadata may also or instead be sent. Operations corresponding to elements 1101 onwards may then be repeated for the next received packet.

If a cache miss occurs (as also detected in operations corresponding to element 1107), an indication of the cache miss may be sent to the flow state tracking tier (element 1125). In some embodiments the received packet RP may be sent to the flow state tracking tier to indicate the cache miss, and a transformed packet or packets may be generated at the flow state tracking tier and transmitted from the flow state tracking tier.

After the indication of the cache miss is transmitted, the PTN may wait to receive a response containing a rewrite entry applicable to RP (element 1128). When such an entry is received it may be added to the local cache at the PTN, which in some cases may require replacing an existing cached entry. The victim entry for replacement may be selected based on various criteria in different embodiments, e.g., based on a least-recently-used algorithm. The PTN may determine (e.g., based on the cache miss response) whether a transformed packet or packets corresponding to RP have already been sent from a different tier of the service (e.g., the flow state tracking tier or the rewriting decisions tier) (element 1131). If no such packets have been sent, the PTN may now perform the operations corresponding to a cache hit (element 1110 onwards). Otherwise, the PTN may process the next received packet of the flow when it arrives, and the operations corresponding to elements 1101 onwards may be performed for that packet. It is noted that the operations to schedule a metadata update to the flow state tracking tier may be performed independently and/or asynchronously with respect to the other operations performed at the PTN in at least some embodiments—e.g., an asynchronous thread of the PTN may be responsible for periodically pushing such updates, instead of or in addition to transmitting such updates after transmitting transformed packets to their destinations as shown in FIG. 11.

Figure 12:
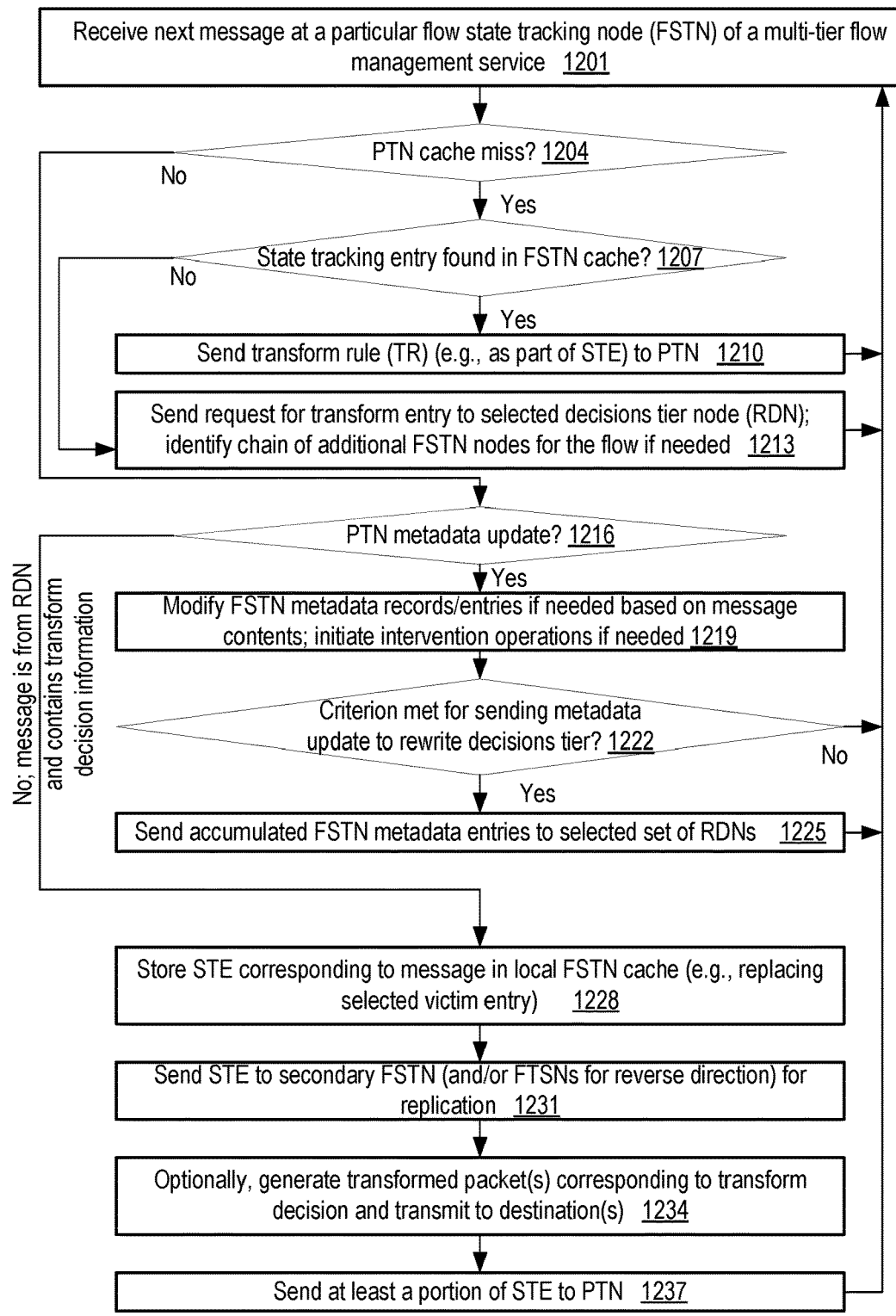
FIG. 12 is a flow diagram illustrating aspects of operations that may be performed at a flow state tracking node of a flow management service, according to at least some embodiments.

FIG. 12 is a flow diagram illustrating aspects of operations that may be performed at a flow state tracking node of a flow management service, according to at least some embodiments. As shown in element 1201, a message may be received at a particular flow state tracking node (FSTN) of a flow management service. The message may have originated at the packet transformation tier of the service, or it may have originated at the rewriting decisions tier in the depicted embodiment. If the message indicates a cache miss at the rewrite entry cache of a packet transformation node (as detected in element 1204), the FSTN may determine whether a state tracking entry (STE) corresponding to the message exists in the FSTN's cache of STE (element 1207).

Such a cache may be maintained in some embodiments for storing rewriting decisions transmitted to the FSTN from one or more rewrite decisions nodes, as well as for storing static and/or dynamic metadata pertaining to the flow, including intervention information, performance metrics and the like. If the STE is found in the FSTN's cache, at least the transformation rule of the entry (or the entire entry) may be sent in a cache miss response to the PTN (element 12210), and the FSTN may proceed to process the next message it receives. If the STE is not found in the FSTN's cache, a request may be sent to a selected rewriting decisions node (element 1213) to complete the FSTN processing associated with the cache miss message in the depicted embodiment. In at least some embodiments, at this stage one or more additional FSTNs may be identified based on fault tolerance requirements, e.g., such that at least two FSTNs have been designated for either direction of the flow.

If the message received at the FSTN represents a metadata update from the packet transformation tier (as detected in element 1216), the FSTN may update its metadata records and/or summaries based on the contents of the message (element 1219).

If the flow being managed has one or more associated intervention descriptor(s), in some embodiments the triggering conditions for the interventions may be checked; if a condition is satisfied, one or more intervention actions such as the transmission of control packets to source and/or destination endpoints may be initiated in various embodiments. In some embodiments, the FSTN node may initiate the action by sending a request or command for the action to some other node of the FMS, such as a PTN; in other embodiments, the action may be initiated by the FSTN itself.

In the depicted embodiment, the FSTN may be responsible for sending flow metadata updates to the rewriting decisions tier, e.g., based on various scheduling criteria such as an expiration of a time interval. If such a criterion is met (as detected in element 1222), the FSTN may send accumulated metadata entries, records, or summaries to selected rewriting decisions nodes (element 1225).

If the message received at the FSTN was neither an indication of a cache miss at a PTN, nor a metadata update from a PTN (as determined in the combination of elements 1204 and 1216), it may comprise an indication of a rewriting generated at an RDN. In this scenario, the FSTN may store a state tracking entry corresponding to the message contents in an FSTN cache (element 1228). In some cases this may require the selection of a currently-cached entry for eviction, e.g., in accordance with an LRU eviction policy or some other replacement technique. In some embodiments the FSTN may optionally initiate the replication of the new state tracking entry at one or more additional FSTNs (element 1231). In at least one embodiment, the FSTN may optionally implement a rewrite directive received from the rewriting decisions tier (element 12234). For example, one or more transformed packets corresponding to the received packet which led to the creation of the state tracking entry may be produced at the FSTN itself and transmitted to their destinations, instead of relying on the packet transformation tier to produce the transformed packets. At least a portion of the state tracking entry may be sent on to the PTN at which the corresponding cache miss was encountered (element 1237). After the processing of the received message is complete, the FSTN may proceed to the next message and perform operations corresponding to elements 1201 onwards for that message. It is noted that the operations to schedule a metadata update to the rewriting decisions tier may be performed independently and/or asynchronously with respect to the other operations performed at the FSTN in at least some embodiments—e.g., an asynchronous thread of the FSTN may be responsible for periodically pushing such updates, instead of or in addition to transmitting such updates after a PTN metadata update is received as shown in FIG. 12.

Figure 13:
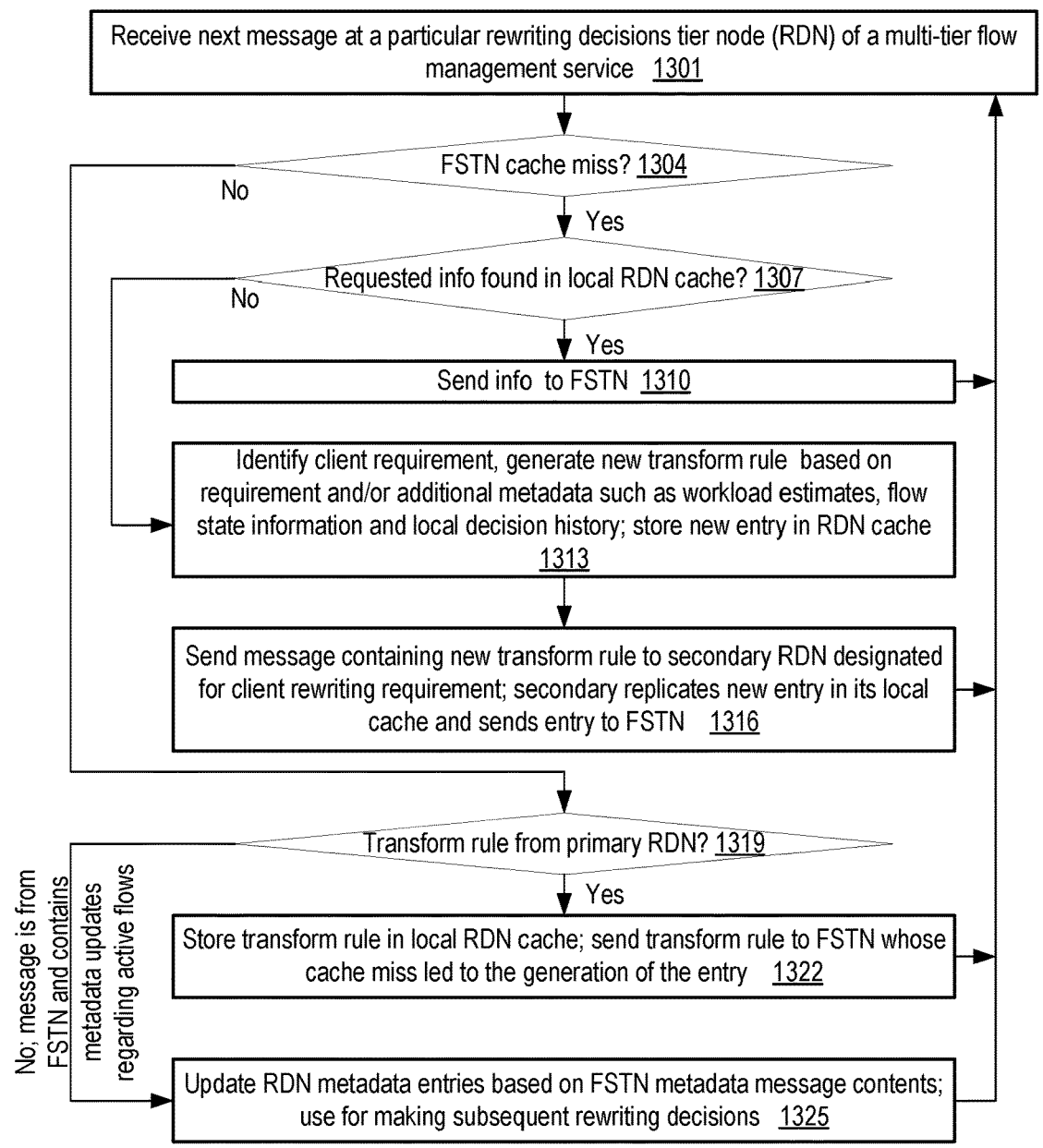
FIG. 13 is a flow diagram illustrating aspects of operations that may be performed at a rewriting decisions node of a flow management service, according to at least some embodiments.

FIG. 13 is a flow diagram illustrating aspects of operations that may be performed at a rewriting decisions node of a flow management service, according to at least some embodiments. As shown in element 1301, a message may be received at a particular rewriting decisions node (RDN). The message may either be from an FSTN, or from another RDN in the depicted embodiment. In the depicted embodiment, the RDN may maintain a cache of its own rewriting decisions or the corresponding state tracking entries. If the message indicates an FSTN cache miss (or a request for a rewrite entry/directive) (as detected in element 1304), and the requested information is present in the cache at the RDN (as detected in element 1307), the entry may be provided to the FSTN (element 1310) in the depicted embodiment.

If no such entry is found (as also detected in element 1307), the RDN may need to produce a new transformation/rewrite directive and/or a corresponding state tracking entry in the depicted embodiment. The details of the client's packet processing requirement associated with the cache miss may be identified in some embodiments (e.g., based on a lookup indexed by the flow identifier of the received packet, which may indicate a particular virtual network interface endpoint address that corresponds to the client's requirement). A new transformation rule or corresponding state tracking entry may be produced (element 1313), based for example on the client's requirement, accumulated history of earlier rewriting decisions and/or flow state metadata received from the state tracking tier. A message containing the new rule or STE may be sent for replication to at least one other RDN, such as a secondary RDN identified for the client requirement (element 1316). In some embodiments the rule or STE may be sent from the other RDN to the FSTN where the cache miss occurred; in other embodiments the RDN at which the rewrite entry is generated may send it to the FSTN.

In the embodiment depicted in FIG. 13, if the message received at the RDN is an STE or a rewriting rule from another RDN (as detected in element 1319), this may imply that the recipient of the message is a secondary RDN (or another RDN in a multi-node replication chain for the entry). Accordingly, the received entry may be replicated locally, and sent to the FSTN from which an indication of a cache miss for the entry was received (element 1322).

If the message received at the RDN was neither a cache miss indication nor a rewrite entry from a peer RDN (as detected in the combination of elements 1304 and 1319), the message may comprise a metadata update from an FSTN. In this scenario, the RDN may update its metadata based on the contents of the message, and may use the updated metadata to make subsequent rewriting decisions (element 1325). As mentioned earlier, probabilistic metadata summaries may be transmitted among various tiers of the flow management service in some embodiments, and such summaries may be included in the messages whose processing is indicated in element 1325. After the processing for a given message is completed, the next message received may be processed in the depicted embodiment, and operations corresponding to elements 1301 onwards may be repeated for that message. It is noted that at least in some embodiments, multiple messages and/or packets may be processed in parallel at a given node at any of the tiers of the flow processing service.

In at least some embodiments, the nodes at various layers of the FMS may transmit entire state tracking entries (STEs), which may contain the specific rewriting or transformation rules to be applied as well as additional metadata, to one another when providing information about a given flow. In other embodiments, just the transformation/rewrite rules may be transmitted to a PTN in the event of a cache miss, while the metadata may be handled using separate messages.

Figure 14:
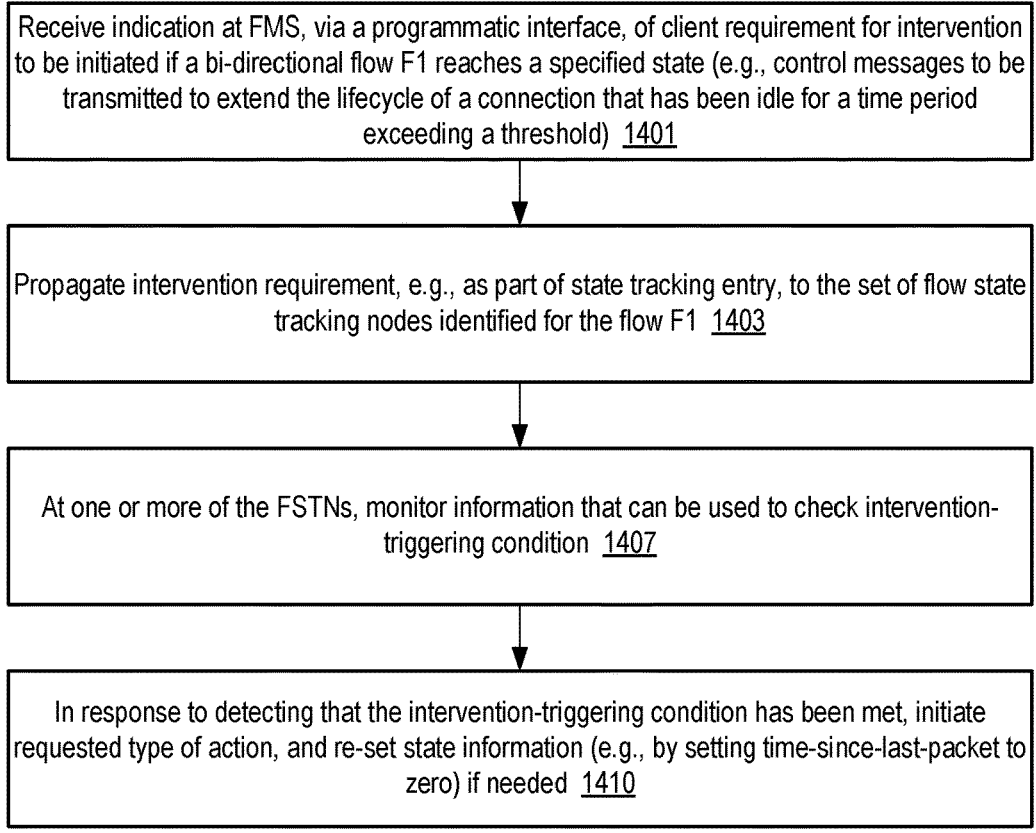
FIG. 14 is a flow diagram illustrating aspects of operations that may be performed to support client-requested intervention operations for network flows, according to at least some embodiments.

FIG. 14 is a flow diagram illustrating aspects of operations that may be performed to support client-requested intervention operations for network flows, according to at least some embodiments. Some clients of network-accessible services may have applications for which connections are to keep alive despite long idle periods, and interventions may be one of the mechanisms used to do so in at least some embodiments. As shown in element 1401, an indication may be received at an FMS node via a programmatic interface, of a client requirement for an intervention operation or action to be initiated if a bi-directional flow F1 reaches a specified state. The action may include, for example, sending control messages to one or more endpoints of a bi-directional flow to extend the lifecycle of a connection that has remained idle for a time period exceeding a threshold in some embodiments. The intervention requirement, which may be expressed as an intervention descriptor in some embodiments formatted according to a syntax specification or guidelines provided by the FMS, may be propagated to various FMS nodes responsible for processing packets and metadata of the flow F1 in various embodiments (element 1403). In at least some embodiments, the intervention requirement or descriptor may be included in a state tracking entry that is stored at one or more of the nodes, including at least some flow state tracking nodes (FSTNs).

In the depicted embodiment, as the packets of flow F1 are transmitted in one or both directions, metrics or other information (such as health state information) that can be used to check the intervention triggering condition(s) may be monitored (element 1407). For example, in at least one embodiment, the elapsed time since the last packet in at least one direction of a bi-directional flow may be tracked at the FSTNs, and compared to a threshold value that would trigger an intervention. In some cases, the client may programmatically specify (a) the threshold and (b) at least one protocol-specific connection state (e.g., a particular TCP or UDP state), such that the elapsed time interval is to be tracked while the bi-directional network flow is in the protocol-specific connection state.

In response to detecting that an intervention-triggering condition has been met, the corresponding action may be initiated in various embodiments (element 1410). For example, to keep a connection alive that might otherwise have been timed out due to lack of packet transfers, one or more control packets may be transmitted to a source and/or destination endpoint of the connection from the FMS. State information that was being used to keep track of the condition may be reset once the action is initiated in at least some embodiments—e.g., a timeOsincde-last-packet variable may be set to zero after the control packet(s) are sent in the above example scenario. A variety of intervention descriptors, each indicating a condition and a corresponding action, may be stored as part of the flow metadata (e.g., in state tracking entries) in some embodiments for a given flow.

Figure 15:
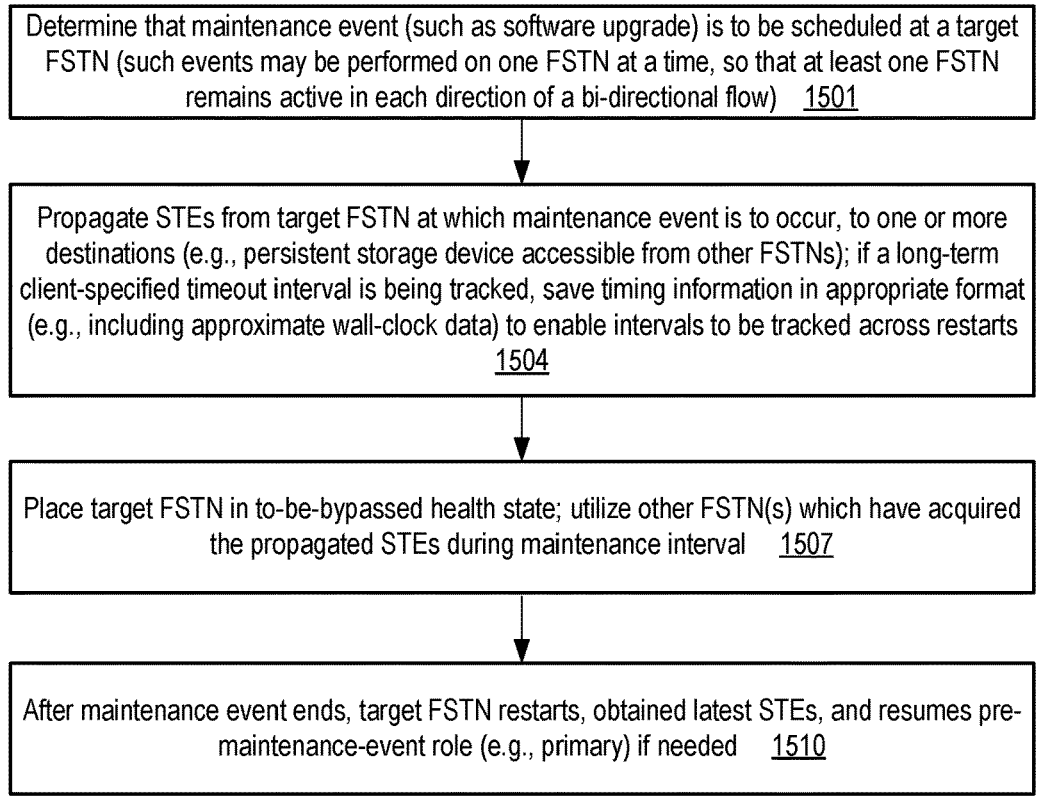
FIG. 15 is a flow diagram illustrating aspects of operations that may be performed to retain connection state information during maintenance events, according to at least some embodiments.

FIG. 15 is a flow diagram illustrating aspects of operations that may be performed to retain connection state information during maintenance events, according to at least some embodiments. As shown in element 1501, a determination may be made that a maintenance event (such as a software, firmware or hardware upgrade) is to be scheduled at a flow state tracking node (FSTN) of a flow management service. In some embodiments, instead of performing such maintenance events in parallel at all the FSTNs, the maintenance events may be scheduled for one FSTN at a time, so that for example at least one FSTN remains in a non-maintenance mode for each direction of traffic flow at any given point in time. At least some of the FTSNs being used for a given flow may have recently-updated local state tracking entries (STEs) for the flow at the time that the maintenance event is scheduled.

From the targeted FSTN at which the maintenance event is scheduled, one or more STEs may be propagated or copied to one or more destinations (such as persistent storage devices accessible from other FTSNs) in the depicted embodiment (element 1504). In some cases, in order to be able to transfer information pertaining to one or more intervention descriptors across restarts (or should the need arise to transfer responsibilities of the target FSTN to some other FSTN), some of the original contents of an STE may be transformed in the propagated version. For example, if a long-term timeout interval is being tracked at the request of a client for the purposes of keeping a connection alive, timing information may be stored in a different format (e.g., approximate wall-clock time) than in its original format (e.g., clock ticks).

The target FSTN may be placed in a special to-be-bypassed health state for the duration of the maintenance event in the depicted embodiment (element 1507), so that other components of the FMS are able to route traffic to substitute FSTNs if necessary. The substitute FSTNs (e.g., the secondary FSTN for the traffic direction for which the primary FSTN was targeted for maintenance) may acquire the propagated STEs as needed in various embodiments from the destinations at which the STEs were stored. After the maintenance event ends, the target FSTN may be restarted (element 1510). The target FSTN may obtain the latest versions of the STEs, e.g., from the substitute FSTNs or from the destinations at which the STEs were stored in some embodiments, and resume its pre-maintenance-event role(s) for various flows. In some embodiments, the target FSTN may not necessarily resume its per-maintenance role after the maintenance event—e.g., if it was the primary for an inbound direction of traffic of a particular flow prior to the maintenance event, and another FSTN took over the primary role for that flow during the maintenance event, the target FSTN may assume the secondary role for that direction after it restarts.

It is noted that in various embodiments, operations other than those illustrated in the flow diagrams of FIG. 10-FIG. 15 may be used to implement at least some of the techniques for supporting flexible packet processing techniques using a flow management service described above. Some of the operations shown may not be implemented in some embodiments, may be implemented in a different order than illustrated in FIG. 10-FIG. 15, or in parallel rather than sequentially. In various embodiments, for example, at least some nodes of one or more tiers of the flow management service may comprise multiple threads of execution, and may therefore be capable of processing multiple messages or packets concurrently.

Use Cases

The techniques described above, of establishing a scalable framework for various categories of stateful flow processing, may be useful in a variety of scenarios. As more and more distributed services are migrated to provider network environments, including stateful services such as file stores that are intended to support session-like semantics, the need for efficient and fault-tolerant management of packet transformation operations based on rules that apply to multiple packets of a given flow is also increasing. The selection of multiple flow state tracking nodes for any given network flow may help ensure high availability and fault tolerance for a variety of applications. Furthermore, enabling clients to specify intervention actions to be taken if a given flow reaches a particular state may help customize the networking operations on a per-client, per-application basis in various embodiments. In embodiments in which the flow management service comprises multiple tiers, the clean separation of function between a packet transformation tier, a flow state management tier and a rewriting decisions tier may simplify the rollout of new functionality or additional nodes at each of the tiers without affecting the work being done at the other tiers.

Illustrative Computer System

Figure 16:
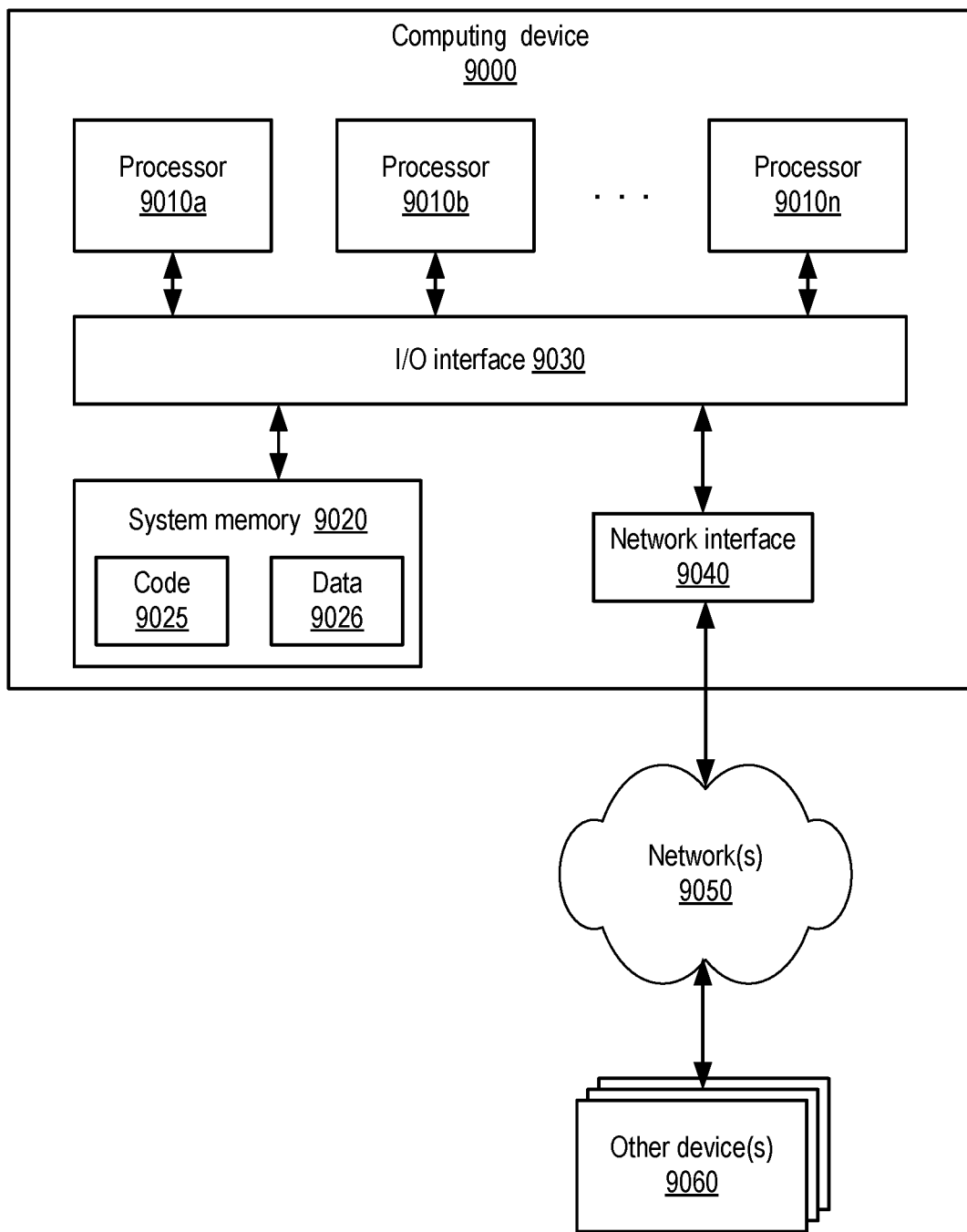
FIG. 16 is a block diagram illustrating an example computing device that may be used in at least some embodiments.

In at least some embodiments, a server that implements one or more of the control-plane and data-plane components that are used to support the stateful flow management techniques described herein may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 15 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computing devices:
        obtaining a representation of a first flow management requirement of a first client of a network-accessible service, wherein the requirement comprises one or more of: (a) a set of source addresses of network packets, (b) a set of destination addresses, (c) a packet transformation descriptor, or (d) a flow intervention descriptor indicating a first action to be implemented in response to a detection that a network flow satisfies a first condition;
        in response to detecting that a state tracking entry for a particular bi-directional network flow is not stored at a flow management service comprising a plurality of nodes, wherein the particular bi-directional network flow is distinguishable from other network flows by a combination of one or more of: a network protocol, a source network address, a source network port, a destination network address or a destination network port,
        designating, prior to routing a first packet of the particular bi-directional network flow, at least (a) a first plurality of state tracking nodes comprising a first direction primary node and a first direction secondary node, for a first direction of the particular bi-directional network flow and (b) a second plurality of state tracking nodes comprising a second direction primary node and a second direction secondary node for a second direction of the particular bi-directional network flow; and
        storing, prior to routing the first packet, at individual nodes including the first direction primary node and the first direction secondary node of the first plurality and at individual nodes including the second direction primary node and the second direction secondary node of the second plurality, a respective state tracking entry for the particular bi-directional network flow, wherein the respective state tracking entry comprises at least an indication of (a) a transformation to be implemented in accordance with the packet transformation descriptor and (b) the first action;
        in response to determining that (a) a particular packet of the particular bi-directional network flow has been received at the flow management service and (b) the first condition is not satisfied by the particular bi-directional network flow, transmitting at least one transformed packet corresponding to the particular packet to a destination selected based at least in part on the packet transformation descriptor, wherein the first direction primary node performs state tracking for the particular packet and the first direction secondary node is configured to take over responsibilities of the first direction primary node responsive to the first direction primary node being unreachable or failing, and the second direction secondary node is configured to take over responsibilities of the second direction primary node responsive to the second direction primary node being unreachable or failing; and
        in response to determining that the first condition is satisfied by the particular bi-directional network flow, initiating the first action.

2. The method as recited in claim 1, wherein determining that the first condition is satisfied comprises comparing, to a threshold, an interval that has elapsed since a packet of the particular bi-directional network flow was transmitted in at least one direction of the particular bi-directional network flow.

3. The method as recited in claim 2, further comprising performing, by the one or more computing devices:
    receiving, via a programmatic interface from the first client, an indication of (a) the threshold and (b) at least a first protocol-specific connection state, such that the interval is to be tracked while the bi-directional network flow is in the first protocol-specific connection state; and
    storing, in a state tracking entry at one or more nodes of the first plurality or the second plurality of nodes, the threshold.

4. The method as recited in claim 1, wherein initiating the first action comprises:
    generating a first control packet, wherein, in accordance with the network protocol, a response to the first control packet is to be generated by a recipient of the first control packet; and
    transmitting the first control packet to one or more source or destination network addresses of the particular bi-directional network flow.

5. The method as recited in claim 1, wherein a particular state tracking entry stored at a first state tracking node of the first plurality of state tracking nodes comprises one or more performance metrics of the particular bi-directional network flow.

6. The method as recited in claim 1, wherein the packet transformation descriptor indicates one or more of: (a) a load balancing requirement, (b) a multicast requirement, (c) a source address transformation requirement, or (d) a unicast requirement.

7. The method as recited in claim 1, wherein identifying at least a first state tracking node of the first plurality of state tracking nodes comprises:
    applying a deterministic transformation function to a first tuple representing the particular bi-directional network flow, wherein a plurality of elements of the tuple include one or more of: (a) identification information of the first client, (b) the source network address, (c) the source network port, (d) the destination network address, or (e) the destination network port.

8. The method as recited in claim 7, wherein the identification information comprises one or more of: (a) a client account identifier, (b) an identifier of an isolated virtual network established at a provider network on behalf of the first client, or (c) an identifier of a virtual network interface configured on behalf of the first client.

9. The method as recited in claim 1, wherein at least one destination address of the set of destination addresses is assigned to a device within a provider network, and wherein at least one source address of the set of source addresses is assigned to a device external to the provider network.

10. The method as recited in claim 1, wherein at least one destination address of the set of destination addresses is assigned to a device of a first network-accessible service of a provider network, and wherein at least one source address of the set of source addresses is assigned to a device of a second network-accessible service of the provider network.

11. A system, comprising:
one or more computing devices of a flow management service;
wherein the one or more computing devices include instructions that when executed on one or more processors cause the one or more computing devices to:
designate, prior to routing a first packet of a bi-directional network flow, at least (a) a first plurality of state tracking nodes comprising a first direction primary node and a first direction secondary node, for a first direction of the bi-directional network flow and (b) a second plurality of state tracking nodes comprising a second direction primary node and a second direction secondary node for a second direction of the bi-directional network flow; and
store, prior to routing the first packet, at individual nodes including the first direction primary node and the first direction secondary node of the first plurality and at individual nodes including the second direction primary node and the second direction secondary node of the second plurality, a respective state tracking entry for the bi-directional network flow, wherein the respective state tracking entry comprises at least an indication of a packet transformation descriptor; and
in response to determining that a packet of the bi-directional network flow has been received at the flow management service, perform, by the primary node, state tracking for the packet and transmit at least one transformed packet corresponding to the received packet to a destination selected based at least in part on the packet transformation descriptor, wherein the first direction secondary node is configured to take over responsibilities of the first direction primary node responsive to the first direction primary node being unreachable or failing, and the second direction secondary node is configured to take over responsibilities of the second direction primary node responsive to the second direction primary node being unreachable or failing.

12. The system as recited in claim 11, wherein the instructions when executed on the one or more processors cause the one or more computing devices to:
obtain a flow intervention descriptor indicating a first action to be implemented in response to a detection that a network flow satisfies a first condition, wherein the respective state tracking entry comprises a representation of the flow intervention descriptor; and
in response to determining that the first condition is satisfied by the bi-directional network flow, initiate the first action.

13. The system as recited in claim 11, wherein the instructions when executed on the one or more processors cause the one or more computing devices to:
in response to determining, after receiving another packet of another network packet flow, that a rule representing a flow management requirement corresponding to the other network packet flow is not present in a repository, drop the other packet.

14. The system as recited in claim 11, wherein the instructions when executed on the one or more processors cause the one or more computing devices to:
determine, based at least in part on an indication received from a client via a programmatic interface, a number of state tracking nodes to be included in the first plurality of state tracking nodes.

15. The system as recited in claim 11, wherein the first plurality of state tracking nodes comprises a first node instantiated at a first host and a second node instantiated at a second host, and wherein the second plurality of state tracking nodes comprises a third node instantiated at a third host and a fourth node instantiated at a third host.

16. One or more non-transitory computer-accessible storage media storing program instructions that when executed on or across one or more processors cause the one or more processors to:
identify, prior to routing a first packet of a bi-directional network flow, at least (a) a first plurality of state tracking nodes comprising a first direction primary node and a first direction secondary node for a first direction of the bi-directional network flow and (b) a second plurality of state tracking nodes comprising a second direction primary node and a second direction secondary node for a second direction of the bi-directional network flow; and
store, prior to routing the first packet, at individual nodes including the first direction primary node and the first direction secondary node of the first plurality and at individual nodes including the second direction primary node and the second direction secondary node of the second plurality, a respective state tracking entry for the bi-directional network flow, wherein the respective state tracking entry comprises at least an indication of a packet transformation descriptor; and
in response to determining that a packet of the bi-directional network flow has been received at the flow management service, perform, by the first direction primary node, state tracking for the packet and transmit at least one transformed packet corresponding to the received packet to a destination selected based at least in part on the packet transformation descriptor, wherein the first direction secondary node is configured to take over responsibilities of the first direction primary node responsive to the primary node being unreachable or failing, and the second direction secondary node is configured to take over responsibilities of the second direction primary node responsive to the second direction primary node being unreachable or failing.

17. The one or more non-transitory computer-accessible storage media as recited in claim 16, further storing additional instructions that when executed on the one or more processors cause the one or more processors to:

obtain a flow intervention descriptor indicating a first action to be implemented in response to a detection that a network flow satisfies a first condition, wherein the respective state tracking entry comprises a representation of the flow intervention descriptor; and in response to determining that the first condition is satisfied by the bi-directional network flow, initiate the first action.

18. The one or more non-transitory computer-accessible storage media as recited in claim 16, further storing additional instructions that, when executed on the one or more processors cause the one or more processors to:

in response to determining, after receiving another packet of another network packet flow, that a rule representing a flow management requirement corresponding to the other network packet flow is not present in a repository, provide a notification of a missing flow management requirement to one or more destinations.

19. The one or more non-transitory computer-accessible storage media as recited in claim 16, further storing additional instructions that, when executed on the one or more processors cause the one or more processors to:

determine, based at least in part on an indication received from a client via a programmatic interface, a number of state tracking nodes to be included in the first plurality of state tracking nodes.

20. The one or more non-transitory computer-accessible storage media as recited in claim 16, wherein the packet transformation descriptor indicates one or more of: (a) a load balancing requirement, (b) a multicast requirement, (c) a source address transformation requirement, or (d) a unicast requirement.

* * * * *